United States Patent
Reed et al.

(10) Patent No.: US 7,725,200 B2
(45) Date of Patent: May 25, 2010

(54) VALIDATION OF CONFIGURATION SETTINGS IN AN INDUSTRIAL PROCESS

(75) Inventors: Dale Edward Reed, Cleveland Heights, OH (US); Mark K. Carmou, Ayr (CA); N. Andrew Weatherhead, Ayr (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 161 days.

(21) Appl. No.: 11/856,563

(22) Filed: Sep. 17, 2007

(65) Prior Publication Data

US 2008/0097626 A1      Apr. 24, 2008

Related U.S. Application Data

(60) Provisional application No. 60/862,403, filed on Oct. 20, 2006, provisional application No. 60/890,973, filed on Feb. 21, 2007.

(51) Int. Cl.
*G05B 13/02* (2006.01)

(52) U.S. Cl. ............... 700/30; 700/3; 700/110; 700/204; 713/1; 710/8; 710/19

(58) Field of Classification Search ............ 700/30, 700/91, 110, 204; 710/8; 713/1
See application file for complete search history.

(56) References Cited

U.S. PATENT DOCUMENTS

| | | |
|---|---|---|
| 4,118,635 A | 10/1978 | Barrett et al. |
| 4,215,396 A | 7/1980 | Henry |
| 4,519,027 A | 5/1985 | Vogelsberg |
| 4,570,217 A | 2/1986 | Allen et al. |
| 4,602,324 A | 7/1986 | Fujawa et al. |
| 4,910,691 A | 3/1990 | Skeirik |
| 4,990,057 A | 2/1991 | Rollins |
| 5,058,043 A | 10/1991 | Skeirik |
| 5,068,778 A | 11/1991 | Kosem et al. |
| 5,214,577 A | 5/1993 | Sztipanovits et al. |
| 5,255,197 A | 10/1993 | Iida |
| 5,262,954 A | 11/1993 | Fujino et al. |
| 5,388,318 A | 2/1995 | Petta |

(Continued)

FOREIGN PATENT DOCUMENTS

EP      1770464      4/2007

OTHER PUBLICATIONS

OA mailed May 5, 2009 for U.S. Appl. No. 11/864,664, 21 pages.

(Continued)

*Primary Examiner*—Ramesh B Patel
*Assistant Examiner*—Olvin Lopez
(74) *Attorney, Agent, or Firm*—Turocy & Watson LLP; William R. Walbrun; John M. Miller

(57) ABSTRACT

An automation control system can be efficiently developed and maintained as a hierarchical arrangement of configured components that pass process control parameters received from a control component and return reports back to the control component. In particular, control components compare a current configuration to a validated, saved configuration in order to report a configuration status as to whether a process can be conducted as validated. Yet, changes to the configuration of the automation control system that do not affect a validated portion do not preclude continued validated processing.

20 Claims, 16 Drawing Sheets

U.S. PATENT DOCUMENTS

| | | | |
|---|---|---|---|
| 5,420,977 A | 5/1995 | Sztipanovits et al. | |
| 5,450,346 A | 9/1995 | Krummen et al. | |
| 5,555,179 A | 9/1996 | Koyama et al. | |
| 5,673,194 A | 9/1997 | Cipelletti et al. | |
| 5,751,582 A | 5/1998 | Saxena et al. | |
| 5,920,717 A | 7/1999 | Noda | |
| 5,946,212 A | 8/1999 | Bermon et al. | |
| 6,008,985 A | 12/1999 | Lake et al. | |
| 6,289,252 B1 | 9/2001 | Wilson et al. | |
| 6,397,114 B1 | 5/2002 | Eryurek et al. | |
| 6,449,624 B1* | 9/2002 | Hammack et al. | 707/203 |
| 6,459,944 B1 | 10/2002 | Maturana et al. | |
| 6,501,995 B1 | 12/2002 | Kinney et al. | |
| 6,527,018 B2 | 3/2003 | Yamauchi et al. | |
| 6,535,769 B1 | 3/2003 | Konar | |
| 6,615,091 B1 | 9/2003 | Birchenough et al. | |
| 6,662,061 B1 | 12/2003 | Brown | |
| 6,675,324 B2 | 1/2004 | Marisetty et al. | |
| 6,708,104 B2 | 3/2004 | Avery et al. | |
| 6,760,630 B2 | 7/2004 | Turnaus et al. | |
| 6,832,118 B1 | 12/2004 | Heberlein et al. | |
| 6,853,920 B2 | 2/2005 | Hsiung et al. | |
| 6,859,755 B2 | 2/2005 | Eryurek et al. | |
| 6,865,432 B2 | 3/2005 | Brown | |
| 6,996,741 B1 | 2/2006 | Pittelkow et al. | |
| 7,058,712 B1 | 6/2006 | Vasko et al. | |
| 7,089,155 B2 | 8/2006 | Hegel | |
| 7,089,530 B1 | 8/2006 | Dardinski et al. | |
| 7,117,504 B2 | 10/2006 | Smith et al. | |
| 7,123,978 B2 | 10/2006 | Hartman et al. | |
| 7,149,595 B2 | 12/2006 | D'Mura | |
| 7,162,534 B2 | 1/2007 | Schleiss et al. | |
| 7,171,281 B2 | 1/2007 | Weber et al. | |
| 7,249,356 B1* | 7/2007 | Wilson et al. | 718/101 |
| 7,254,457 B1 | 8/2007 | Chen et al. | |
| 7,289,861 B2 | 10/2007 | Aneweer et al. | |
| 7,307,986 B2 | 12/2007 | Henderson et al. | |
| 7,313,453 B2 | 12/2007 | Kline | |
| 7,415,708 B2 | 8/2008 | Knauerhase et al. | |
| 7,424,331 B2 | 9/2008 | Patel | |
| 2001/0049562 A1 | 12/2001 | Takano et al. | |
| 2002/0010908 A1 | 1/2002 | Cheng et al. | |
| 2002/0042896 A1 | 4/2002 | Johnson et al. | |
| 2003/0051071 A1 | 3/2003 | Stefansson et al. | |
| 2003/0149756 A1* | 8/2003 | Grieve et al. | 709/223 |
| 2003/0177018 A1 | 9/2003 | Hughes | |
| 2004/0095833 A1 | 5/2004 | Marisetty et al. | |
| 2004/0158713 A1 | 8/2004 | Aneweer et al. | |
| 2004/0172612 A1 | 9/2004 | Kasravi et al. | |
| 2004/0181294 A1* | 9/2004 | Deitz et al. | 700/19 |
| 2004/0243260 A1* | 12/2004 | Law et al. | 700/86 |
| 2005/0004781 A1 | 1/2005 | Price et al. | |
| 2005/0015769 A1 | 1/2005 | Gegner | |
| 2005/0227217 A1 | 10/2005 | Wilson | |
| 2006/0101433 A1 | 5/2006 | Opem et al. | |
| 2006/0230383 A1 | 10/2006 | Moulckers et al. | |
| 2006/0265688 A1 | 11/2006 | Carlson et al. | |
| 2007/0061125 A1* | 3/2007 | Bhatt et al. | 703/20 |
| 2007/0089100 A1 | 4/2007 | Morris et al. | |
| 2007/0100486 A1 | 5/2007 | Burda et al. | |
| 2007/0101193 A1 | 5/2007 | Johnson et al. | |
| 2007/0162268 A1 | 7/2007 | Kota et al. | |
| 2007/0186090 A1 | 8/2007 | Yu et al. | |
| 2007/0261027 A1 | 11/2007 | Dhanakshirur et al. | |
| 2007/0269297 A1 | 11/2007 | Van Der Meulen et al. | |
| 2008/0120129 A1 | 5/2008 | Seubert et al. | |
| 2008/0126407 A1 | 5/2008 | Shimaoka et al. | |
| 2008/0188960 A1 | 8/2008 | Nixon et al. | |

OTHER PUBLICATIONS

OA mailed May 13, 2009 for U.S. Appl. No. 11/864,733, 23 pages.
OA mailed May 6, 2009 for U.S. Appl. No. 11/864,678, 22 pages.
OA mailed Dec. 17, 2009 for U.S. Appl. No. 11/855,646, 23 pages.

* cited by examiner

VALIDATION OF CONFIGURATION SETTINGS IN AN INDUSTRIAL PROCESS

CROSS REFERENCE TO RELATED APPLICATION

This application claims the benefit of U.S. Provisional Patent Application No. 60/862,403 entitled MODULE CONTROL AND STATE PROPAGATION, and filed on Oct. 20, 2006, the entirety of which is incorporated herein by reference. This application also claims the benefit of U.S. Provisional Patent Application No. 60/890,973 entitled MODULE CONTROL AND STATE PROPAGATION, and filed on Feb. 21st, 2007, the entirety of which is incorporated herein by reference.

TECHNICAL FIELD

The claimed subject matter relates generally to industrial control systems and more particularly to module class components that are defined to facilitate validated software use and detect pertinent configuration changes that affect the validation.

BACKGROUND

One type of industrial control process is referred to as a batch process, which involves subjecting raw materials to processing steps using one or more pieces of equipment to produce a "batch" of product. Efforts to automate batch processing have led to the formation of standards committees by members of industries involved in batch processing and suppliers of batch processing equipment, among others. The general purpose of these standards committees has been to define uniform standards for automated batch processing. One such standard has been promulgated by the International Society for Measurement and Control, an international organization concerned with issues of process control. This standard is entitled Batch Control Part 1: Models and Terminology and is often referred to as the ISA S88.01-1995 standard (or "S88" for purposes of this application).

The S88.01 standard defines models of equipment and procedures for use in automated batch processes, as well as terminology for use in referring to those models and their elements. The S88.01 standard defines a "batch process" as a process that leads to the production of finite quantities of material by subjecting quantities of input materials to an ordered set of processing activities over a finite period of time using one or more pieces of equipment. A "batch" is defined as the material that is being produced or has been produced by a single execution of a batch process.

Batch-processing equipment (i.e., controllable elements such as valves, heaters, mixers, and so forth) is operated according to procedures to produce a batch. Generally, such equipment is referred to synonymously as equipment, equipment modules, processing equipment, or physical elements. The procedures to operate such physical elements are often referred to by the S88.01 standard as the "procedural model." According to the S88.01 standard, the procedural model is structured as a hierarchical ranking of procedures, with the highest level encompassing each of the lower levels, the next highest level encompassing each of the levels below it, and so on. Typically, the levels of the S88.01 procedural model of a particular application are, in descending order: the "procedure;" the "unit procedure;" the "operation;" and the "phase."

The term "procedural element" generally refers to components that employ any of the levels of the S88.01 procedural model, not just to those of the "procedure" level or any other single level of the procedural model. The highest-level procedural element of interest is referred to as a procedure, which is made up of one or more unit procedures. Each unit procedure is in turn made up of one or more operations, which are each in turn made up of one or more phases. The S88.01 procedural model does not preclude definition and use of other hierarchical levels, nor does it require that each level be present in particular applications. Rather, the standard is intended to provide a broad, standardized model for describing the procedures followed in automated batch-process control.

Heavily regulated industries such as pharmaceuticals often have Federal Validation requirements to ensure that products are manufactured to desired standards. Validation is a very expensive proposition during installation to properly document and show that the system indeed meets the applicable standards. Once a system has been validated, any changes made to the system can cause the entire system to be re-validated if it is not clear how the change may have impacted the system.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The invention relates to automatic monitoring of a system for configuration or other changes. Such monitoring can be performed at a modular level, where comparisons are made between the validated system and the present system. If a change is detected within the system, automated notifications can be sent and reports can be generated identifying the impact to the system. The reports can mitigate re-validation requirements for the changed system. Configuration data can be segmented into data which is aligned with specific roles in a production facility. By storing an authorized copy of the configuration, and comparing to the current configuration over time, the system is able to inform the user of configuration changes.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

An automation control system can be efficiently developed and maintained as a hierarchical arrangement of configured components that pass process control parameters received from a control component and return reports back to the control component. In particular, control components compare a current configuration to a validated, saved configuration in order to report a configuration status as to whether a process can be conducted as validated. Yet, changes to the configuration of the automation control system that do not affect a validated portion do not preclude continued validated processing, avoiding expense and delay of re-validation.

These features are enhanced as being part of a programming environment of module class subsets in which portions of a given module that were previously coded by hand have been identified and generated automatically for the designer in view of an identified class. The identified class represents an analysis of functional elements within the module that can be generically provided before system design/implementation. For example, Equipment or Phase Modules (or other type modules) can be decomposed into sub components and classes, thus allowing commonality between equipment modules and other points of a module's extension to be identified. This allows building a limited number of equipment modules from the respective classes to address the large (virtually infinite) number of process or discrete applications. Example Equipment Modules provided include Generic, Material Transfer, and Equipment Verification. Respective Equipment Modules can communicate with associated Phase Modules which have also been developed according to a class structure. By identifying common portions of modules and codifying the respective portions in advance, code generation and development for the common portions identified is mitigated which in turn conserves resources for system designers and end users.

It is noted that as used in this application, terms such as "component," "module," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
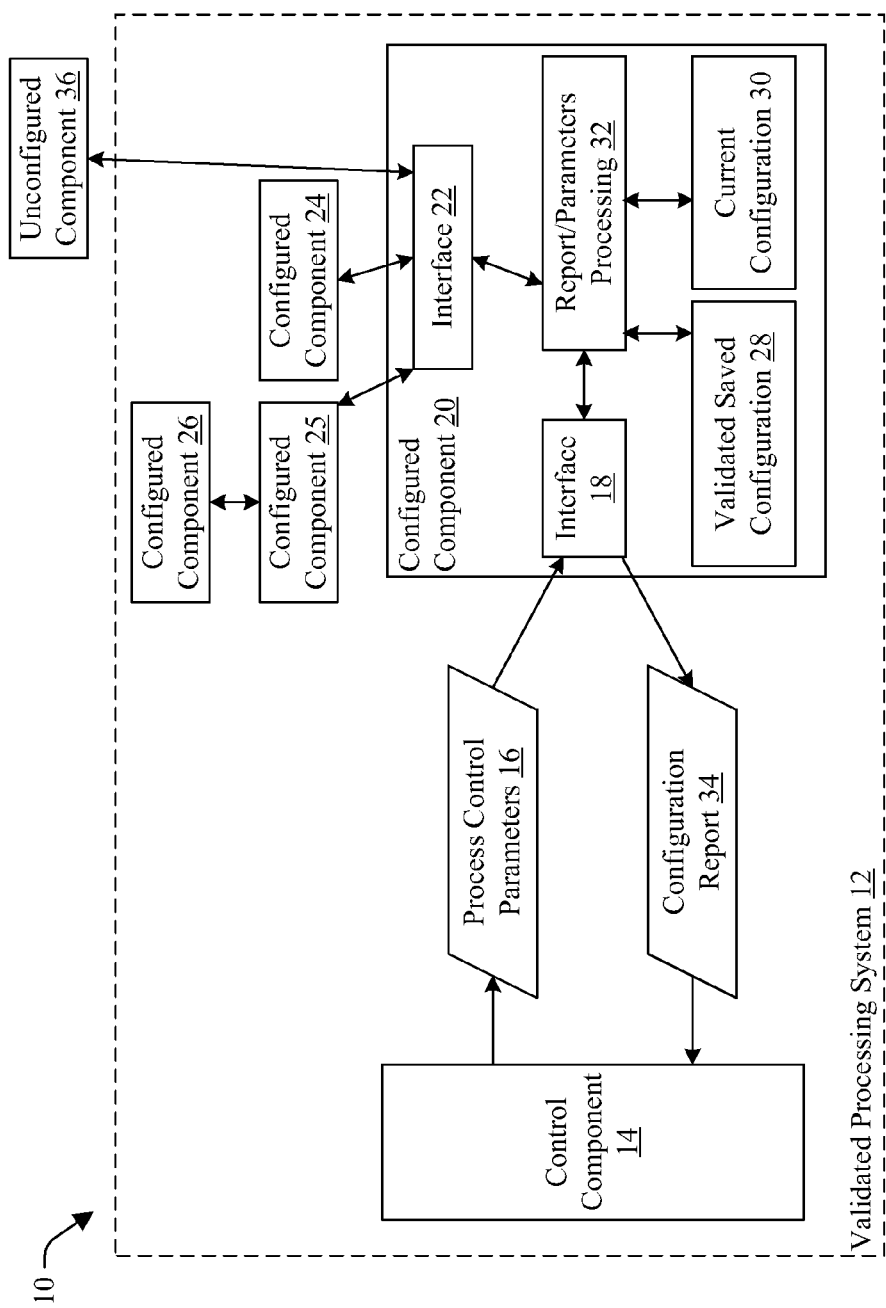
FIG. 1 is a schematic block diagram illustrating hierarchical configured elements responsive of a control element for an industrial automation system.

Referring initially to FIG. 1, an automation control system 10 includes a portion designated as a validated processing system 12 that has been approved when operated in an unchanged configuration to produce a validated result (e.g., pharmaceutical product). In particular, a control component 14 passes process control parameters 16 via an interface 18 to a configured component 20, that may in turn pass on the received process control parameters 16 via an interface 22 to a hierarchy of configured components 24-26 in order to control equipment (not shown). A validated saved configuration data structure 28 is compared against a current configuration data structure 30 by report/parameter processor 32 with an unvalidated configuration returned to the control component 14 as a configuration report 34. Thereby, inadvertent production of an unvalidated product is avoided.

Detection provides opportunities for mitigation without necessitating full re-validation of the system 12. For example, should the automation control system 10 include an unconfigured component 36 that is not utilized as part of the validated processing system 12, the unconfigured component 36 can be ignored without reporting. In addition, should a configured component 20 have been modified by a changed parameter, then the validated saved configuration data structure 28 can be readily restored before proceeding. If the changed configuration pertains to a change in code, then configured component 20 can be instantiated with a validated version. If the changed configuration pertains to a hardware change, then simplified revalidation procedures may be appropriate, such as confirming that the new equipment has been unit tested to return the automation control system 10 to a validated status or that a certified replacement has been installed.

It should be appreciated with the benefit of the present disclosure that the monitoring may be distributed. Configuration changes can be detected by the same component or detected by a higher level component monitoring subservient components. Moreover, the configuration data structure may include identification of functions that are disabled to retain a validated state (e.g., preventing parameter changes via a human-machine interface (HMI)).

Figure 2:
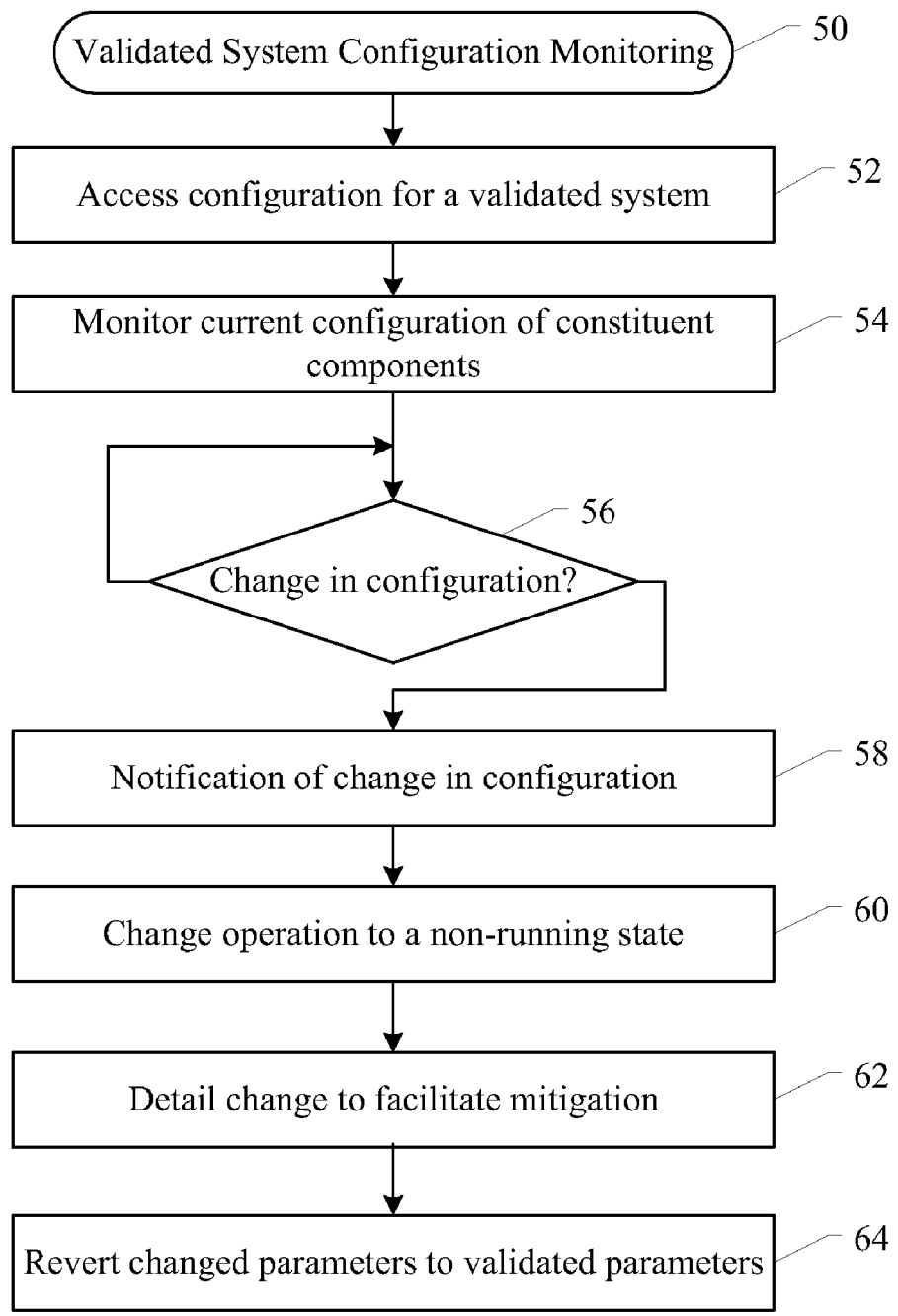
FIG. 2 is a flow diagram of a methodology for monitoring configuration changes of an industrial automation system.

In FIG. 2, a methodology 50 of a validated industrial automation system mitigates re-validation requirements for constituent components that are changed. Each constituent component (e.g., software module, processing equipment, parameter data structure, enabled functions, etc.) has an accessible validated configuration that is compared against a current configuration (block 52). Various security features prevent unauthorized modifications to the data that describes the validated configuration. The current configuration of the constituent components are monitored for changes (block 54). If a change is detected by comparing the saved versus the current configuration (block 56), then a notification occurs (block 58). This notification can place the automation system in non-running state (e.g., paused, stopped, abort) (block 60). The specifics of the change can be further analyzed so that a detailed notification is reported via an HMI so that tailored re-validation procedures may be employed or changed components restored to the validated baseline (block 62), with one such mitigation being a restoring changed parameters to validated parameters (block 64). By such configuration (i.e., parameterized code) methodology, loss of original (validated) settings is avoided and expensive and time-consuming re-validation is avoided. Also avoided is the negative ramification of producing an unvalidated product.

Figure 3:
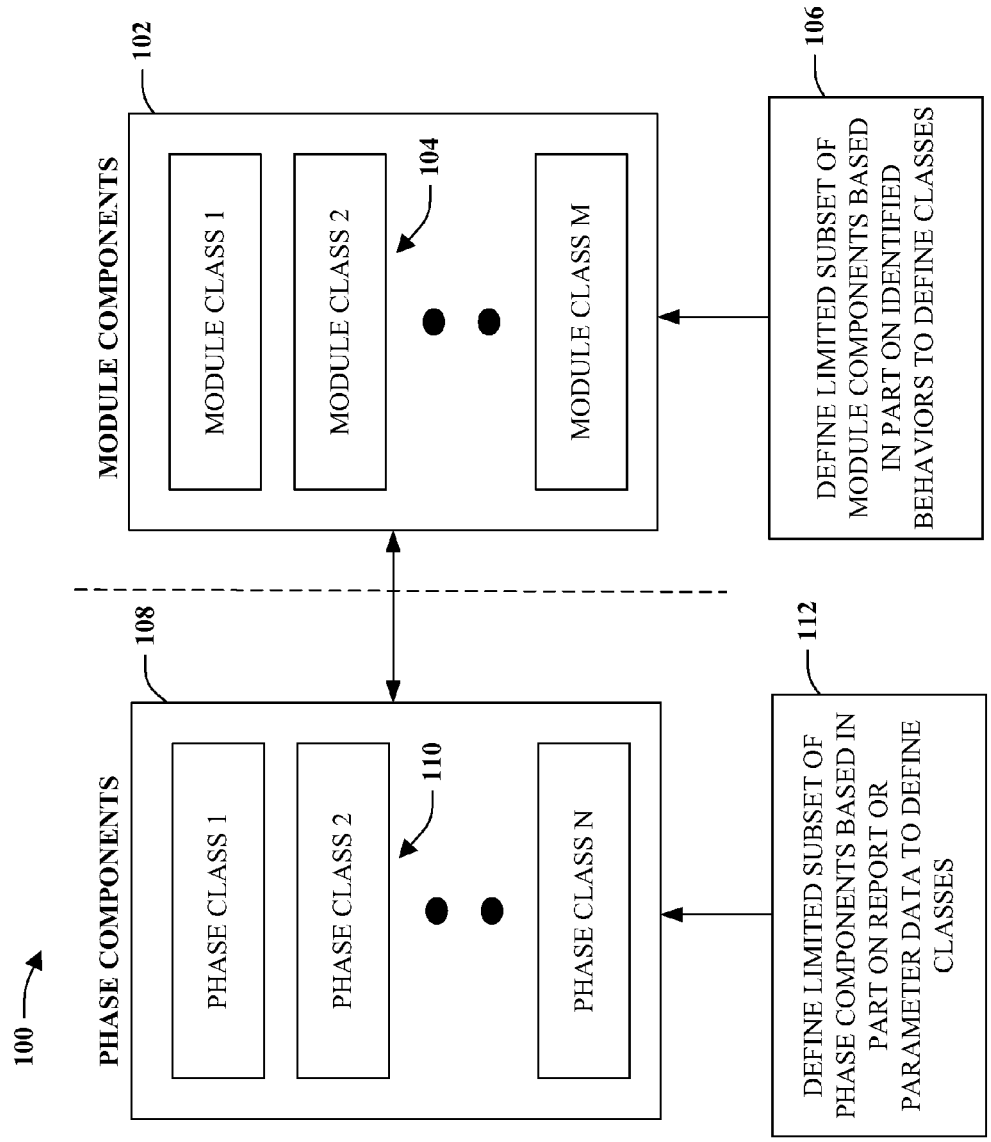
FIG. 3 is a schematic block diagram illustrating industrial control module and phase components for the industrial automation system of FIG. 1.

In FIG. 3, in addition to being a hierarchical arrangement of configured components, an illustrative hierarchical industrial automation system 100 advantageously separates phases (e.g., recipe phases, equipment phases, etc.) from modules (e.g., unit modules, equipment modules, command modules) to control an industrial automation environment. One or more module components 102 include one or more module class components 104. The module class components 104 identify common functional portions of the module components 102 that can be identified and provided in advance to systems designers in order to mitigate coding or redesign of the module components themselves. As shown at 106, a limited subset or class of module components 102 can be provided to facilitate a substantially large number of control applications. This can include defining the limited subset at 106 based in part on identified module behavior for example. Similarly, one or more phase components 108 can also be provided that in turn include one or more phase class components 110. As with the module components 102, the phase class components 110 can identify common portions which can be provided in advance and form a limited subset or class of phase modules that can satisfy a large number of control applications. As shown at 112, a limited subset of phase modules 108 can be defined based in part on report or parameter data for example.

In general, the phase components 108 send control commands to the module components 102 and receive status there from. As will be described in more detail below with respect to FIGS. 5 and 6, the phase components 108 and the module components 102 can be broken into various classes such as interfaces, commands, status, parameters, and so forth. From such functional identifications via the classes, common module or phase elements can be defined allowing a limited class or subset of module and phase components to serve a large variety of control applications. In this manner, a large set of modules can be reduced to a limited subset defined by the identified classes.

Generally, module class subsets include portions of a given module or phase that were previously coded by hand and have been identified and generated automatically for the designer in view of an identified class. The identified class represents an analysis of functional elements within the module or phase that can be generically provided before system design/implementation. For example, Equipment or Phase Modules (or other type modules) can be decomposed into sub components and classes, thus allowing commonality between equipment modules and other points of a module's extension to be identified. This allows building a limited number of equipment modules from the respective classes to address the substantially large number of process or discrete actions.

A limited number of equipment modules and equipment phases may be used with minimal customization to satisfy the majority of process action requirements although it is to be appreciated that other modules can be added to the subset. Behavior can be a determining factor in the classification of Equipment Modules, for example.

The module components 102 or phase components 108 can be an association of logic with one or more resources. The logic includes program code that can alter the state of a resource for example, ladder code, function chart, script, JAVA, C code, and so forth. The resources are those components or elements that perform an activity in a system including equipment and personnel that perform work in a system. Other examples of types of resources include Equipment, Material, Personnel, Segments and Storage. Personnel and equipment (machines) can perform activities in a system. Resources that can perform work can be classified as active resources (e.g., CNC machine, Injection molding machine), whereas other equipment resources can be considered passive resources (e.g., sensor, material). In general, the modules hide the user from internal interfaces, messages, and logic specific to the resources yet provide standard or generic interfaces to external systems or between components.

Modules may include other modules including nested modules where standard module behaviors and attribute patterns can be represented using common data model representations for module classes, module templates and module inheritance. Module classes and templates can be maintained in libraries which facilitate access to desired system functionality and further promote system integration. Resources can have various states associated therewith such as common S88 state classifications including idle, hold, abort, run, reset, stop, restart, and so forth where the module can present logic to represent state machines that manage the state of the resource. During application, resource modules (described below) can take on the name of the resource that is the primary focus on the module. For example, an Equipment module is primarily focused on coordination of equipment but may involve personnel in the process. Similarly, a Personnel module is focused on coordination of personnel but may involve other resources in the process. A Control Module that manages a material may be referred to as a Material Control Module and so forth.

It is noted that components associated with the system 100 can include various computer or network components such as servers, clients, programmable logic controllers (PLCs), communications modules, mobile computers, wireless components, control components and so forth which are capable of interacting across a network. Similarly, the term PLC as used herein can include functionality that can be shared across multiple components, systems, and/or networks. For example, one or more PLCs can communicate and cooperate with various network devices across the network. This can include substantially any type of control, communications module, computer, I/O device, sensor, Human Machine Interface (HMI) that communicate via the network which includes control, automation, and/or public networks. The PLC can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 4:
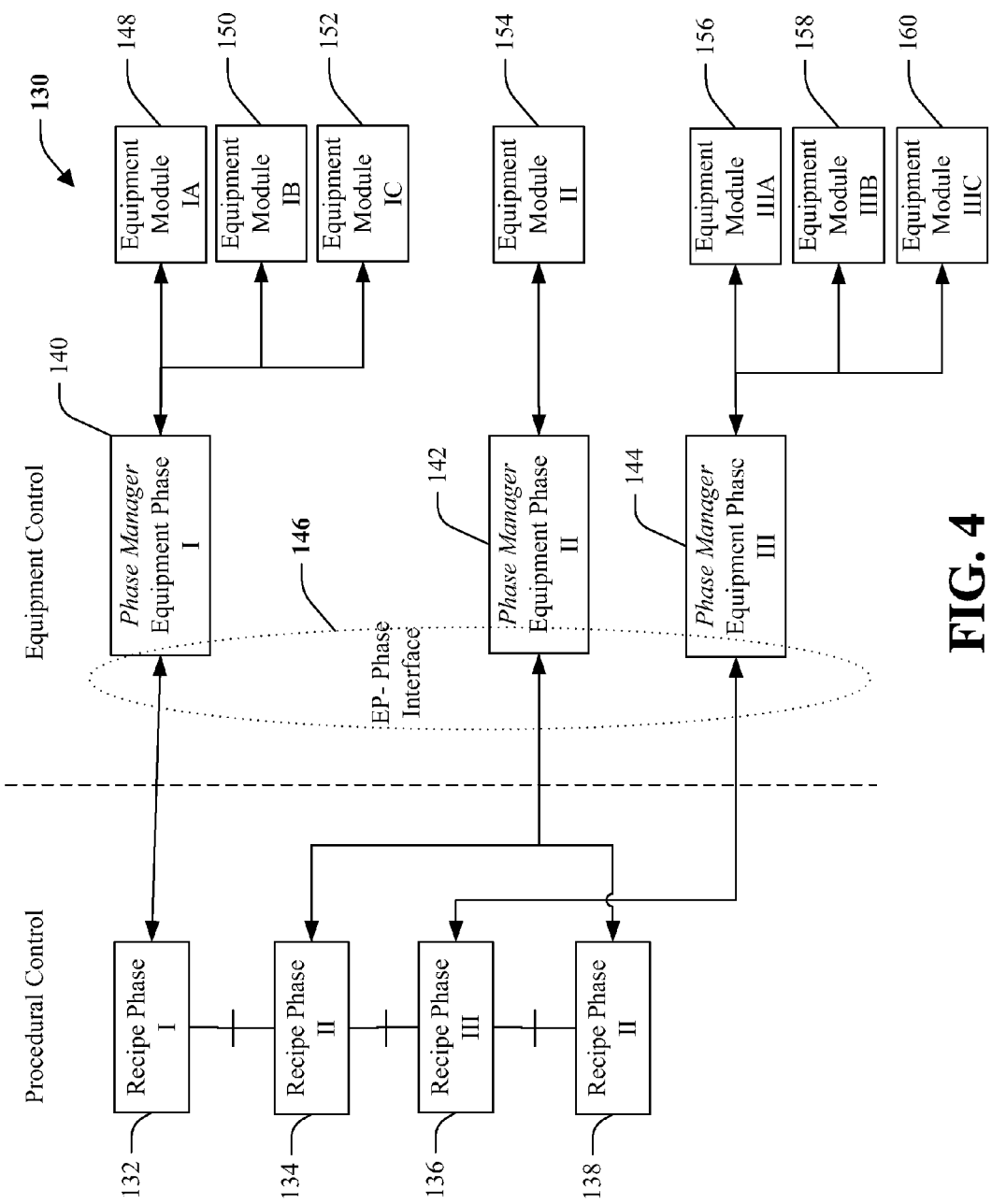
FIG. 4 is a schematic block diagram depicting an illustrative batch process.

Referring now to FIG. 4, an illustrative batch process 130 depicts multiple batch sequencers, that is recipe phase I, II, III, II depicted at 132, 134, 136, 138 respectively, connected to Equipment Phase Managers (Equipment Phases I, II, III) depicted at 140, 142, 144 respectively via an EP's Phase Interface 146. Each Recipe phase manager 132, 134, 136, 138 supports transient phase states of Aborting, Holding, Resetting, Restarting, Running, and Stopping, each of which can represent a phase state routine that triggers the corresponding state within an Equipment Module. In the illustrative batch process 130, Phase Manager 140 triggers Equipment Modules IA, IB, IC, depicted at 148, 150, 152 respectively. Phase Manager 142 triggers Equipment Module II, depicted at 154. Phase Manager 144 triggers Equipment Modules IIIA, IIIB, IIIC, depicted at 156, 158, 160 respectively. Each Equipment Module 148-160 contains the logic to coordinate and sequence the associated control modules (not depicted) to carry out the process action.

Figure 5:
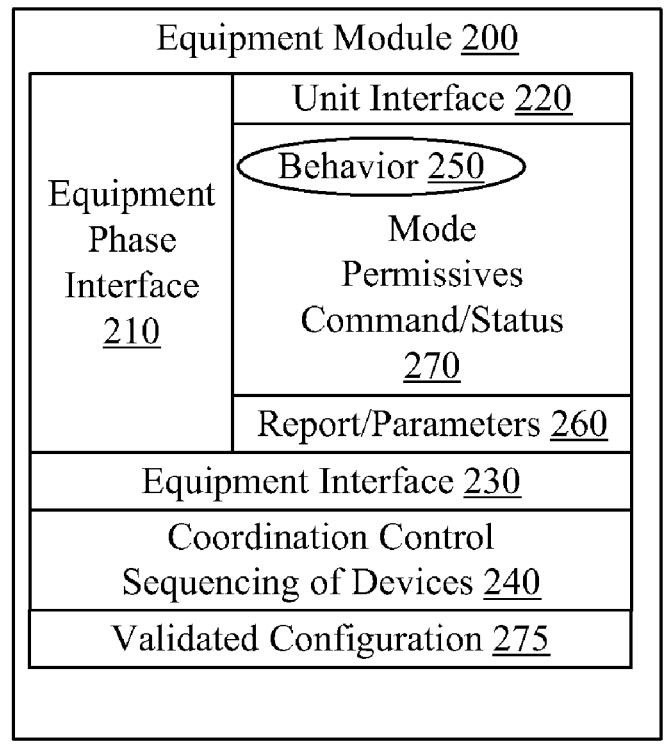
FIG. 5 is a block diagram of an example equipment module of FIG. 3 that has been functionally decomposed into class components.

Referring now to FIG. 5, an example equipment module 200 that has been functionally decomposed into respective class components is illustrated. It is to be appreciated that the equipment module 200 is exemplary in nature and that other types of modules and/or classes are possible. The equipment module (EM) 200 can include an equipment phase interface 210 that provides a linkage to/from an Equipment Phase (EP) which is described in more detail below with respect to FIG. 6. This interface 200 determines how the EM 200 interacts with the EP. A standard Equipment Phase interface 210 may be created that applies to all Equipment Module classes. These should provide a mechanism to pass report/parameter data and provide a simple interface between the Equipment Phase and the Equipment Module.

At 220, a Unit interface provides a linkage to/from a respective Unit such as described in a typical S88/S95 procedure. This interface 220 determines how the EM 200 interacts with the Unit. A standard Unit interface 220 may be created that applies to all Equipment Module classes. Equipment Modules 200 should be aware of their Unit, where the propagation of mode and faults may be facilitated via the Unit interface 220.

An Equipment interface 230 provides a linkage to/from Equipment (Subordinate EM's and control modules (CM's)). This interface 230 determines how the EM 200 interacts with Equipment. A standard equipment interface can be created that applies to the Equipment Module classes.

At 240, coordination control, and sequencing of equipment refers to the logic associated with commanding the state of subordinate Equipment/Control modules. Generally, coordination and sequencing is facilitated via the Equipment Interface 210. Coordination and Sequencing may be achieved using a number of different methods, such as via hard coded logic or sequencer. The method is generally not considered part of the Equipment Module. Typically, coordination and sequencing is implementation dependant, and should not be used to determine the definition of class(es).

At 250, behavior describes the functional behavior of a particular Equipment Module 200. A number of the behaviors 250 exhibited by an Equipment Module 200 are common to Equipment Modules. Some equipment modules 200 may exhibit unique behavior. For instance, a Material Transfer may require the ability to restart in addition to under tolerance. Some differences in behavior 250 may be masked on/off using configuration commands. Generally, behavior 250 is a determining factor in establishing the definition of Equipment Module class(es).

At 260, parameters (e.g., process parameters) are data items which are provided by the recipe phase, via the Equipment Phase to the Equipment Module 200. Report (process results) data items at 260 are produced by the Equipment Module 200, and published to the Recipe Phase via the Equipment Phase interface at 210. Generally, equipment modules 200 inherit recipe parameters from Equipment Phases, and process these parameters. Equipment modules 200 produce report data at 260 and provide this data to the Equipment Phase via the interface 210. A standardized data structure may be created for parameter data within the Equipment Module 200. The Equipment Module 200 can also provide the capability to customize this data structure. A standardized data structure may be created for report data within the Equipment Module 200 which can also provide the capability to customize this data structure. Depending on the number of unique data sets required for report/parameters, the processing and production of this data may be a determining factor in the definition of Equipment Module class(es). As shown at 270, other class components in the equipment module 200 can include mode data, permissive data, and command/status data that can be passed to/from the respective interfaces associated with the equipment module.

Configuration commands that change the Behavior 250 are reflected in the class components 270 (e.g., mode, permissives, and command/status) and thus can be compared to a saved validated configuration data structure (validated configuration) 275 for a self determination of a changed configuration, warranting a notification via the report/parameters component 260. The validated configuration 275 may also capture such data for components linked to the unit or equipment interfaces 220, 230. The monitoring of other components can compensate for legacy devices not capable of self-monitoring for configuration changes.

Figure 6:
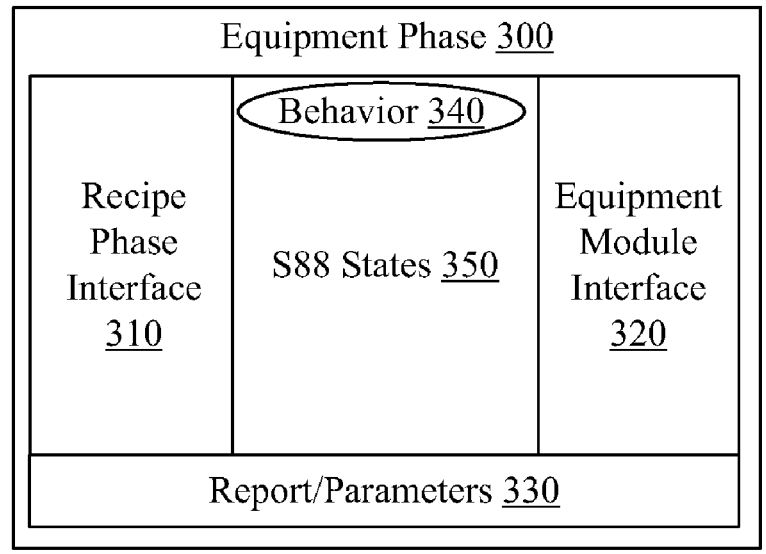
FIG. 6 illustrates an example equipment phase of FIG. 3 that has been functionally decomposed into respective class components.

Turning to FIG. 6, an example equipment phase 300 that has been functionally decomposed into respective class components is illustrated. The equipment phase 300 (EP) can interface with the equipment module described above with respect to FIG. 5. It is to be appreciated that the equipment phase 300 is exemplary in nature and that other types of phases and/or classes are possible.

A phase interface 310 provides a linkage to/from a respective Recipe Phase (not shown) to control a process. This interface 310 determines how the EP 300 interacts with the Recipe Phase. A standard Phase interface may be created that applies to all Equipment Phase classes, which supports the S88 state model, or subset of the S88 state model, for example. The phase interface should also provide a component to pass report/parameter data.

At 320, an Equipment Module interface provides a linkage to/from the respective Equipment Module such as depicted in FIG. 2. This interface determines how the EP 300 interacts with the Equipment module. A standard Equipment Module interface 320 may be created that applies to all Equipment Phase classes and should provide a component to pass report/parameter data.

At 330, parameters (process parameters) are data items which are provided by the recipe phase, to the Equipment Phase 300. The Equipment Phase 300 then provides this data to the Equipment Module. Report (process results) data items are produced by the Equipment Module, and published to the Equipment Phase 300. The Equipment Phase then provides this data to the Equipment Phase. Generally, Equipment modules inherit recipe parameters from Equipment Phases. Such modules also produce report data and provide this data to the Equipment Phase 300. Depending on the number of unique data sets required for report/parameters 330, the processing and production of this data may be a determining factor in the definition of Equipment Module class(es).

At 340, behavior describes the functional behavior of a particular Equipment Module. Generally, the Equipment Phase 300 should support the S88 state model, a subset of the S88 state model, or similar models. Typically, all Equipment Phases exhibit similar behavior. Differences in behavior may be masked on/off using configuration. Behavior 340 is generally not a determining factor in establishing the definition of Equipment Module class(es) described above. As shown, one or more S88 states may be controlled at 350.

Figure 7:
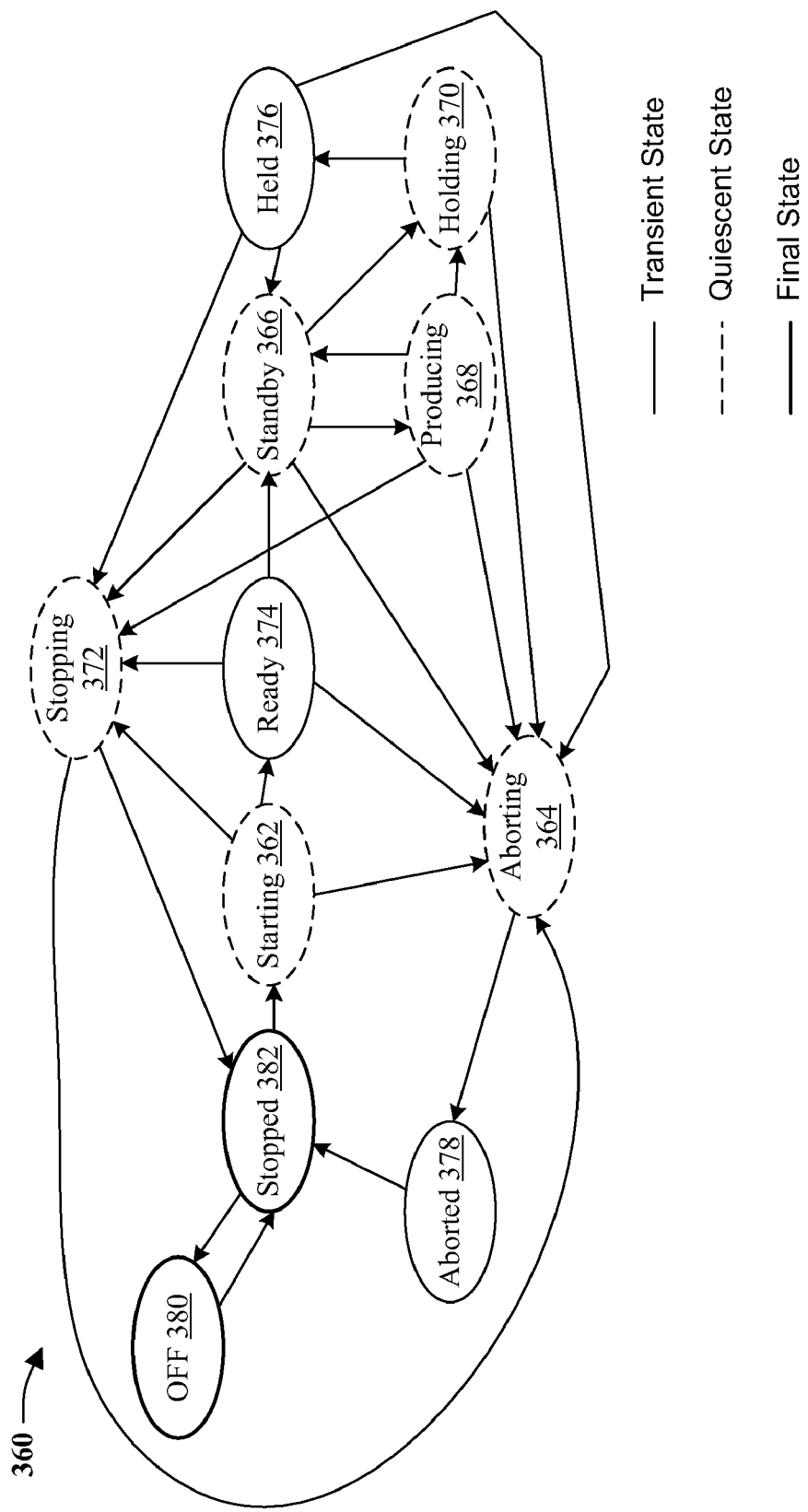
FIG. 7 is a state diagram of the equipment phase of FIG. 3.

In FIG. 7, a state model 360 invoked by the phase components 140 is depicted as including quiescent states: Starting 362, Aborting 364, Standby 366, Producing 368, Holding 370, and Stopping 372. The state model 360 includes transient states: Ready 374, Held 376, and Aborted 378. The state model includes final states: Off 380 and Stopped 382. Processing can go from the Off state 380 to the Stopped state 382. Processing can go from the Stopped state 382 to the Starting state 362 or the Off state 380. Processing can go from the Starting state 362 to the Aborting state 364, the Ready state 374, or the Stopping state 372. Processing can go from the Ready state 374 to the Standby state 366, Aborting state 364, or to the Stopping state 372. Processing can go from the Standby state 366 to the Producing state 368, the Holding state 370, the Aborting state 364 or the Stopping state 372. Processing can go from the Producing state 368 to the Standby state 366, the Holding state 370, the Aborting state 364, or to the Stopping state 372. Processing can go from the Holding state 370 to the Aborting state 364 or the Held state 376. Processing can go from the Held state 376 to the Standby state 366, the Stopping state 372 or the Aborting state 364. Processing can go from the Aborting state 364 to the Aborted state 378. Processing goes from the Aborted state 378 to the Stopped state 382. Processing goes from the Stopping state 372 to the Stopped state 382 or to the Aborting state 364.

Figure 8:
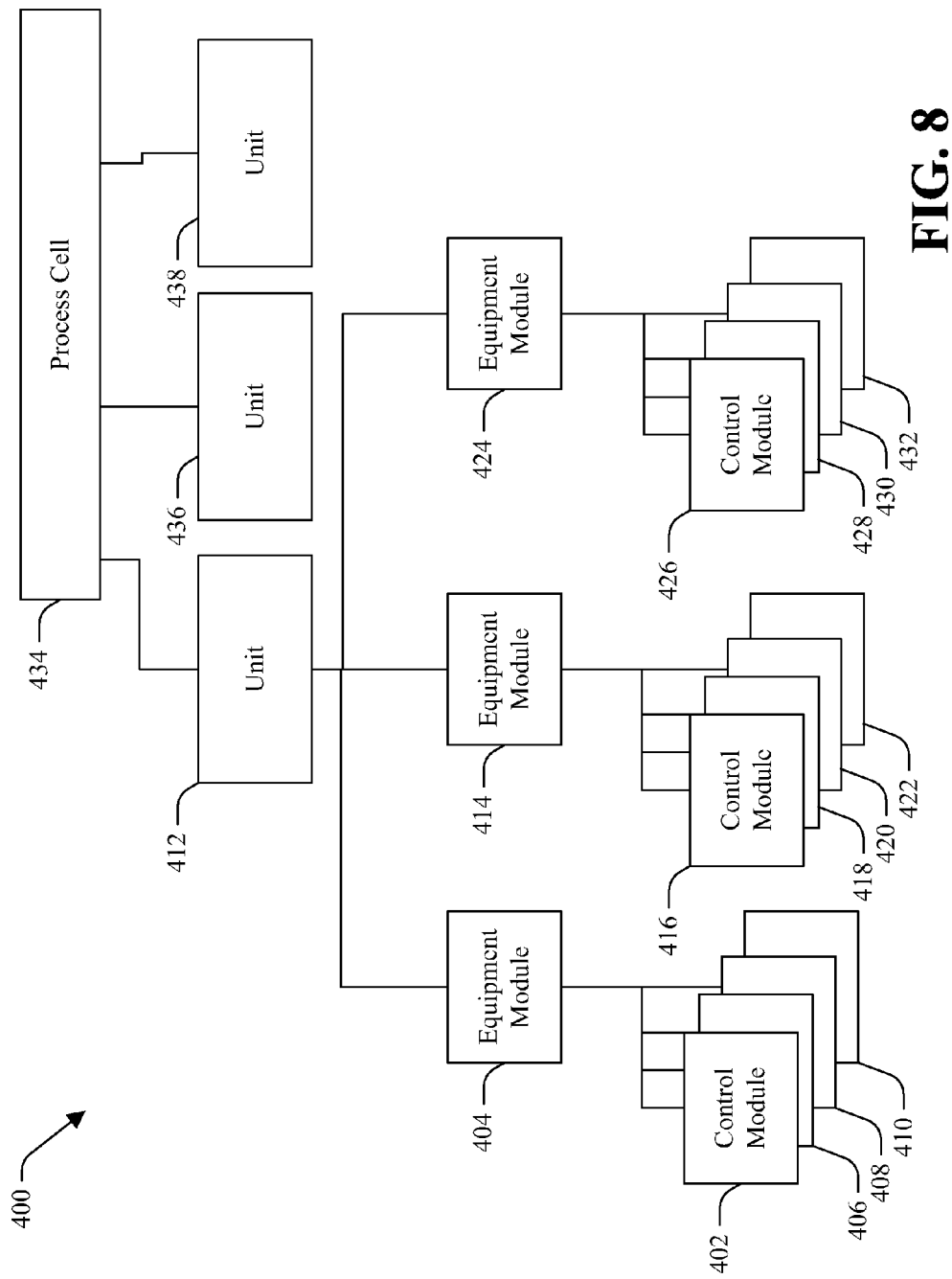
FIG. 8 is a diagram of a process cell supported by units, equipment modules, and control modules.

In FIG. 8, an example control system 400 with confirmation validation illustrates propagation of notification of an unvalidated configuration. In response to a configuration change (e.g., replacement of a component such as a valve, change of an operating parameter stored for a component, etc.), a control module 402 responsible for the component reports the configuration nonconformity to an equipment module 404 that is interfaced to other control modules 406, 408, 410. The equipment module 404 detects this configuration nonconformity and acts accordingly by reporting this nonconformance to an associated unit module 412, which also is linked to equipment module 414 having control modules 416-422 and linked to equipment module 424 having control modules 426-432. The associated unit module 412 in turn reports the configuration invalidity to an associated process cell 434. Based upon behavior defined for a validated configuration upon detection of a nonconforming condition, other unit modules 436, 438 as well as the reporting unit module 412 can initiate a state change for their corresponding components by acting through any intervening equipment and command modules.

The highest level of the control architecture, such as the process cell 414, may set the mode. As an example, modes may include Auto, Semi-Auto and Manual. Based on configuration information modules at a lower level in the hierarchy may inherit this mode from the module above. The validated configuration, for instance, may require an Auto mode be inherited by the rest of the architecture, or other modes based on configuration information.

An example of a control module 402 is a Two State Valve Control Module used to operate and monitor a standard mechanical valve used in production facilities. This type of valve opens and closes based on commands issued by this module. The control module also monitors feedback from the valve, if present, to indicate whether it is open or closed. This device functions via the control system in auto and manual mode. Commands are provided to allow auto and manual mode control for the device. A separate set of Open/Close commands exist for each mode. Auto commands are only issued by controller logic, and manual commands are only issued from the HMI. Violation of this operation will result in a fault of the device. By modifying a control module instance's configuration data, the behavior of a particular module instance can be modified. An example of this would be changing a valve from type "Normally Open" to type "Normally Closed" via the Reverse Acting configuration bit. Once all device configurations are considered valid, an individual of appropriate authorization level may save the current settings. If the control module's configuration settings ever deviate from the saved setting, an indication will appear on the HMI faceplate. An authorized individual will then have the opportunity to save the current configurations or restore the previously saved configuration.

An illustrative data structure for tracking the configuration pertinent to an control module 402 is provided in Table 1.

TABLE 1

| Name | Type | Description | Details |
|------|------|-------------|---------|
| EID | STRING | Equipment ID | This configuration is used to store the text ID representation of this device. This configuration is used to display the device ID on the HMI. |
| DESC | STRING | Equipment Description | This configuration is used to store the text Description of this device. This configuration is used to display the device ID on the HMI |
| UER | DINT | Unique Equipment ID Reference Number | This configuration attribute is used to assign a unique module identifier to the device. The program logic shall generate the UER value based on the equipment class identifier and the CM_V2S instance number. The UER value is generated so that other program modules may interface with this module using a single reference number. |
| POF | DINT | Auto Pulse Time Off | This dictates the time duration for the closed cycle of the pulse sequence when active. |
| PON | DINT | Auto Pulse Time On | This dictates the time duration for the open cycle of the pulse sequence when active. |
| FT | DINT | FT Timer Preset | Fault timer commands are maintained for this amount of time. |
| IHP | DINT | Input Module Health Pointer | This is a pointer to the IO Buffer location for input health data. |
| OHP | DINT | Output Module Health Pointer | This is a pointer to the IO Buffer location for output health data. |

TABLE 1-continued

| Name | Type | Description | Details |
|---|---|---|---|
| ESP | DINT | E-Stop Pointer | This is a pointer to the IO Buffer location for E-Stop zone data. |
| SSP | DINT | Software Stop Pointer | This is a pointer to the IO Buffer location for S-Stop zone data. |
| ODT | DINT | Open Valve Delay Timer | This configuration is used to delay the open status of a valve if the open limit switch is not present or confirmed. |
| CDT | DINT | Closed Valve Delay Timer | This configuration is used to delay the closed status of a valve if the closed limit switch is not present or confirmed. |
| UID | DINT | Unit ID | Use this configuration to assign the CM to a specific Unit, or area. |
| RAC | BOOL | Reverse Acting | This is set if the valve requires the digital output to be energized to close. |
| VAM | BOOL | Visible Auto/Manual | This is set if the valve only has manual mode and the AUTO/MANUAL pushbuttons are to be hidden on the HMI template. |
| PIB | BOOL | Process Interlock Bypass | By setting this configuration to a 1 all process interlocks will be ignored by the system. |
| LSCC | BOOL | Limit Switch Closed Confirmed In Service | By setting this configuration to 0, the control module ignores the closed limit switch i/o and determines the closed status based on the commanded state. |
| LSCS | BOOL | Limit Switch Closed In System | By setting this configuration to 0, the control module ignores does not expect the closed limit switch. |
| LSOC | BOOL | Limit Switch Open Confirmed In Service | By setting this configuration to 0, the control module ignores the open limit switch i/o and determines the open status based on the commanded state. |
| LSOS | BOOL | Limit Switch Open In System | By setting this configuration to 0, the control module does not expect the open limit switch. |
| HOAC | BOOL | HOA Confirm In Service | Set the HOAC to a value of 1 to enable HOA functionality in the CM. |
| HOAS | BOOL | HOA Confirm In System | Set the HOAS to a value of 1 to enable HOAC functionality in the CM. |
| HNDS | BOOL | HOA - Hand Confirm In System | Set HNDS to 1 if the HOA - Hand Position is valid for this control module. |
| OFFS | BOOL | HOA - Off Confirm in System | Set OFFS to 1 if the HOA - Off Position is valid for this control module. |
| AUTS | BOOL | HOA - Auto Confirm In System | Set AUTS to 1 if the HOA - Auto Position is valid for this control module. |
| PULS | BOOL | Pulse Confirm In System | Set the PULS to a value of 1 to enable pulsing functionality in the CM. |
| MLP | BOOL | System Mode Lock Permitted | Set this configuration if the system is allowed to lock the auto/manual mode of the device. |
| EN | BOOL | Module Enabled | This is a configuration item used to determine whether the control module is actively being used by the system. Because individual CM's are a part of a larger CM array, this configuration is used to prevent the processor from scanning the associated logic for a particular instance (array index). The result of the setting is improved scan time in the controller. Note: By setting this value to a 0, the device logic will not be scanned. |
| ARNS | BOOL | Auto Return to Normal State. 0 = Enabled | This is a configuration item used to determine if the CM_V2S core logic will, when in Auto Mode return to the default state when a command is not received. With this bit reset the Equipment Module logic is expected to Latch Auto Requests each scan. The CM_V2S core logic will reset this request at the end of the program scan. This allows for the use of a single auto command to open and when removed close the device. This also allows for simple and clean code initialization. |
| D1MN | DINT | Data Entry Field 1. Minimum Value | The minimum value for the HMI face plate $1^{st}$ data entry field |
| D1MX | DINT | Data Entry Field 1. Maximum Value | The maximum value for the HMI face plate $1^{st}$ data entry field |
| D2MN | DINT | Data Entry Field 2. Minimum Value | The minimum value for the HMI face plate $2^{nd}$ data entry field |
| D2MX | DINT | Data Entry Field 2. Maximum Value | The maximum value for the HMI face plate $2^{nd}$ data entry field |
| D3MN | DINT | Data Entry Field 3. Minimum Value | The minimum value for the HMI face plate $3^{rd}$ data entry field |

TABLE 1-continued

| Name | Type | Description | Details |
|---|---|---|---|
| D3MX | DINT | Data Entry Field 3. Maximum Value | The maximum value for the HMI face plate $3^{rd}$ data entry field |
| P1DC | STRING [20] | Description of Process. Interlock 1 | The P1DC tag will hold the user defined Process Interlock 1 Description |
| P2DC | STRING [20] | Description of Process. Interlock 2 | The P2DC tag will hold the user defined Process Interlock 2 Description |
| P3DC | STRING [20] | Description of Process. Interlock 3 | The P3DC tag will hold the user defined Process Interlock 3 Description |
| P4DC | STRING [20] | Description of Process. Interlock 4 | The P4DC tag will hold the user defined Process Interlock 4 Description |
| EU1 | STRING [4] | HMI Faceplate Engineering Units Storage 1 | The HMI Face Plates require a storage location for engineering units. EU1 holds a null string for this CM |
| EU2 | STRING [4] | HMI Faceplate Engineering Units Storage 2 | The HMI Face Plates require a storage location for engineering units. EU2 holds the Timers engineering units for this CM |
| EU3 | STRING [4] | HMI Faceplate Engineering Units Storage 3 | The HMI Face Plates require a storage location for engineering units. EU3 is spare for this CM |

An illustrative data structure for tracking the configuration pertinent to an equipment module 404 is provided in Table 2. An Equipment Module—General as defined by S88 is the following: An equipment module is a functional group of equipment that can carry out a finite number of specific minor processing activities. An equipment module is typically centered around a piece of process equipment (e.g., a weigh tank, a process heater, a scrubber, etc.). This term applies to both the physical equipment and the equipment entity. Examples of minor process activities are dosing and weighing. By modifying an Equipment Module—General instance's configuration data, the behavior of a particular module instance can be modified. Once all module configurations are considered valid, an individual of appropriate authorization level may save the current settings. If the Equipment Module—General configuration settings ever deviate from the saved setting, an indication will appear on the HMI faceplate. An authorized individual will then have the opportunity to save the current configurations or restore the previously saved configuration.

TABLE 2

| Name | Type | Description | Details |
|---|---|---|---|
| EID | STRING_20 | Equipment Name | This configuration is used to store the name of this device. This configuration is used to display the device name on the HMI. |
| DESC | STRING_40 | Equipment Description | This configuration is used to store the text Description of this device. This configuration is used to display the device ID on the HMI |
| UER | DINT | Unique Equipment ID Reference Number | This configuration attribute is used to assign a unique module identifier to the device. The program logic shall generate the UER value based on the equipment class identifier and the EM_GEN instance number. The UER value is generated so that other program modules may interface with this module using a single reference number. |
| UID | DINT | Unit ID | This configuration attribute is used to assign the EM to a specific Unit, or area. |
| N | DINT | Number of Steps | Defines the number of steps for the Equipment Module - General. Since the Equipment Module contains an internal step engine, this variable represents the last state to be processed. (Valid range is 1-99) |
| SST | DINT | Slow Step Timer Preset | The Slow Step Timer is designed to monitor a possible warning condition if a step within the sequence is taking too long. This preset may be manually set by the user of written to by the User Implemented Program Logic. If the Slow Step Timer Accumulated value exceeds the preset a warning will be set. A preset value of zero (0) will disable this feature. The Slow Step Timer Preset is in seconds. |
| VAM | BOOL | Visible Auto/Semi-Auto | This attribute is set if the Equipment Module - General only has Semi Auto mode and the AUTO/SEMI pushbuttons are to be hidden on the HMI template. |
| PIB | BOOL | Process Interlock Bypass | By setting this configuration to a 1 all programmed/configure process interlocks will be ignored by the Equipment Module - General. |

TABLE 2-continued

| Name | Type | Description | Details |
|---|---|---|---|
| PPB | BOOL | Process Permissive Bypass | By setting this configuration to a 1 all programmed/configure process permissives will be ignored by the Equipment Module - General. |
| MLP | BOOL | System Mode Lock Permitted | This configuration attribute is set if the system is allowed to lock the Auto/Manual mode of the device. |
| WRT | BOOL | Wait for Report Data to be Collected | When the WRT configuration bit is set, the Equipment Module - General will monitor and wait for the Complete Report Trigger CRT to be reset before transitioning from the Requested to Enabled and Running State. |
| MFW | BOOL | Regard Mode Faults as Warnings | When the MFW configuration bit is set, the Equipment Module - General will regard all Mode Faults (MF1, MF2 and MF3) as warnings. This will prevent the operator from having to acknowledge these faults as well as preventing the setting of the FLT status bit when one of these faults occurs. |
| FUF | BOOL | Fault EM on Unit Fault Status | When the FUF configuration bit is set (1), the Equipment Module - General will enter the Faulted state when a Unit Fault occurs. Control Module Faults may be mapped back to their associated Unit. In this case with the FUF configuration bit set a CM fault can propagate up to the Unit and then back down to the Equipment Module |
| PTXT [y] | DINT | Parameter Text HMI Visability | The PTXT bit array configuration structure allows the user to define which Parameters are visible on the HMI EM Face Plates. 0 = Visible |
| RTXT [y] | DINT | Report Text HMI Visability | The RTXT bit array configuration structure allows the user to define which Reports are visible on the HMI EM Face Plates. 0 = Visible |
| EN | BOOL | Module Enabled | This is a configuration item used to determine whether the Equipment Module - General is actively being used by the system. Since individual Equipment Module - Generals are a part of a larger EM array, this configuration is used to prevent the processor from scanning the associated logic for a particular instance (array index). Note: By setting this value to a 0, the device logic will not be scanned. |
| FAS | DINT | First Aborting State Step Number | When the Equipment Module - General initially transition into the Aborting State from any other state, the value stored within the FAS register will be written to the Actual Step number of the Equipment Module - General.<br>In the case that this state is not required, a value of zero (0) within this register, will inform the Equipment Module - General core logic to automatically set the state complete bit. |
| FHS | DINT | First Holding State Step Number | When the Equipment Module - General initially transition into the Holding State from any other state, the value stored within the FAS register will be written to the Actual Step number of the Equipment Module - General.<br>In the case that this state is not required, a value of zero (0) within this register, will inform the Equipment Module - General core logic to automatically set the state complete bit. |
| FRSS | DINT | First Resetting State Step Number | When the Equipment Module - General initially transition into the Resetting State from any other state, the value stored within the FAS register will be written to the Actual Step number of the Equipment Module - General.<br>In the case that this state is not required, a value of zero (0) within this register, will inform the Equipment Module - General core logic to automatically set the state complete bit. |
| FRTS | DINT | First Restarting State Step Number | When the Equipment Module - General initially transition into the Resetting State from any other state, the value stored within the FAS register will be written to the Actual Step number of the Equipment Module - General. In the case that this state is not required, a value of zero (0) within this register, will inform the Equipment Module - General core logic to automatically set the state complete bit. |
| FRGS | DINT | First Running State Step Number | When the Equipment Module - General initially transition into the Running State from any other |

TABLE 2-continued

| Name | Type | Description | Details |
|---|---|---|---|
| | | | state, the value stored within the FAS register will be written to the Actual Step number of the Equipment Module - General. In the case that this state is not required, a value of zero (0) within this register, will inform the Equipment Module - General core logic to automatically set the state complete bit. |
| FSS | DINT | First Stopping State Step Number | When the Equipment Module - General initially transition into the Resetting State from any other state, the value stored within the FAS register will be written to the Actual Step number of the Equipment Module - General. In the case that this state is not required, a value of zero (0) within this register, will inform the Equipment Module - General core logic to automatically set the state complete bit. |
| ESP | DINT | E-Stop Pointer | This is a pointer to the IO Buffer location for E-Stop zone data. |
| SSP | DINT | Software Stop Pointer | This is a pointer to the IO Buffer location for S-Stop zone data. |
| P1S | DINT | Process Description 1 First Step Number | This register stores the 1st step number that should display "Process Description 1". This process description will remain displayed on the HMI until the next Process Description overwrites it or the Equipment Module - General completes. Default Value = 1 |
| P2S | DINT | Process Description 2 First Step Number | This register stores the 1st step number that should display "Process Description 2". This process description will remain displayed on the HMI until the next Process Description overwrites it or the Equipment Module - General completes. Default Value = 2 |
| P3S | DINT | Process Description 3 First Step Number | This register stores the 1st step number that should display "Process Description 3". This process description will remain displayed on the HMI until the next Process Description overwrites it or the Equipment Module - General completes. Default Value = 3 |
| P4S | DINT | Process Description 4 First Step Number | This register stores the 1st step number that should display "Process Description 4". This process description will remain displayed on the HMI until the next Process Description overwrites it or the Equipment Module - General completes. Default Value = 4 |
| PSD1 | STRING_20 | Process Step Description 1 | Used to describe a group of Equipment Module - General Steps. |
| PSD2 | STRING_20 | Process Step Description 2 | Used to describe a group of Equipment Module - General Steps. |
| PSD3 | STRING_20 | Process Step Description 3 | Used to describe a group of Equipment Module - General Steps. |
| PSD4 | STRING_20 | Process Step Description 4 | Used to describe a group of Equipment Module - General Steps. |
| PP1D | STRING [20] | Description of Process Permissive 1 | The PP1D tag will hold the user defined Process Permissive 1 Description |
| PP2D | STRING [20] | Description of Process Permissive 2 | The PP2D tag will hold the user defined Process Permissive 2 Description |
| PP3D | STRING [20] | Description of Process Permissive 3 | The PP3D tag will hold the user defined Process Permissive 3 Description |
| PP4D | STRING [20] | Description of Process Permissive 4 | The PP4D tag will hold the user defined Process Permissive 4 Description |
| EF1T | STRING_40 | EM Fault 1, Description | Used to describe definable Equipment Module - General Fault. |
| EF2T | STRING_40 | EM Fault 2, Description | Used to describe definable Equipment Module - General Fault. |
| EF3T | STRING_40 | EM Fault 3, Description | Used to describe definable Equipment Module - General Fault. |
| EF4T | STRING_40 | EM Fault 4, Description | Used to describe definable Equipment Module - General Fault. |
| D1MN | DINT | Data Entry Field 1 Minimum Value | The minimum value for the HMI face plate $1^{st}$ data entry field |
| D1MX | DINT | Data Entry Field 1 Maximum Value | The maximum value for the HMI face plate $1^{st}$ data entry field |
| D2MN | DINT | Data Entry Field 2 Minimum Value | The minimum value for the HMI face plate $2^{nd}$ data entry field |
| D2MX | DINT | Data Entry Field 2 Maximum Value | The maximum value for the HMI face plate $2^{nd}$ data entry field |

TABLE 2-continued

| Name | Type | Description | Details |
|---|---|---|---|
| D3MN | DINT | Data Entry Field 3 Minimum Value | The minimum value for the HMI face plate $3^{rd}$ data entry field |
| D3MX | DINT | Data Entry Field 3 Maximum Value | The maximum value for the HMI face plate $3^{rd}$ data entry field |
| EU1 | STRING [4] | HMI Faceplate Engineering Units Storage 1 | The HMI Face Plates require a storage location for engineering units. EU1 holds a xxx string for this EM |
| EU2 | STRING [4] | HMI Faceplate Engineering Units Storage 2 | The HMI Face Plates require a storage location for engineering units. EU2 holds the xxx engineering units for this EM |
| EU3 | STRING [4] | HMI Faceplate Engineering Units Storage 3 | The HMI Face Plates require a storage location for engineering units. EU3 holds the xxx engineering units for this EM |
| SEQN | DINT | Sequencer Number | |

An illustrative data structure for tracking the configuration pertinent to an unit module 412 is provided in Table 3. A Unit is an element of the physical model within the ISA S88.01 standard. As an example each vessel, tank, mixer, machine, etc. . . . within the control system would be considered a Unit. A Unit module is based in a Programmable Logic Controller. Within S88 hierarchy the Unit exists above the Equipment Modules and Control Modules. The Unit is responsible for managing the equipment that is associated to that unit. These responsibilities include, but are not limited to, the following: Mode propagation; Fault propagation; Vessel Management; Batch Campaign Management.

TABLE 3

| Name | Type | Description | Details |
|---|---|---|---|
| EID | STRING_20 | Equipment Name | This configuration is used to store the name of this device. This configuration is used to display the device name on the HMI. |
| DESC | STRING_40 | Equipment Description | This configuration is used to store the text Description of this device. This configuration is used to display the device ID on the HMI |
| UER | DINT | Unique Equipment ID Reference Number | This configuration attribute is used to assign a unique module identifier to the device. The program logic shall generate the UID value based on the equipment class identifier and the UNIT instance number. The UID value is generated so that other program modules may interface with this module using a single reference number. |
| VAM | BOOL | Visible Auto Mode | This attribute is set if the user wishes the hide the Auto Mode selection button from the operator. This may be used to disable Auto Mode. |
| VSM | BOOL | Visible Semi Auto Mode | This attribute is set if the user wishes the hide the Semi Auto Mode selection button from the operator. This may be used to disable Semi Auto Mode. |
| VMM | BOOL | Visible Manual Mode | This attribute is set if the user wishes the hide the Manual Mode selection button from the operator. This may be used to disable Manual Mode. |
| PIB | BOOL | Process Interlock Bypass | By setting this configuration to a 1 all programmed/configure process interlocks will be ignored by the EM. |
| MLP | BOOL | System Mode Lock Permitted | This configuration attribute is set if the system is allowed to lock the Auto/Manual mode of the device. |
| EN | BOOL | Module Enabled | This is a configuration item used to determine whether the UNIT Module is actively being used by the system. Since individual UNIT's are a part of a larger UNIT array, this configuration is used to prevent the processor from scanning the associated logic for a particular instance (array index). Note: By setting this value to a 0, the device logic will not be scanned. |
| EAS | BOOL | Enable Availability Status | This is a configuration item used to determine whether the Unit Availability Status is actively being used by the system. When set to zero (0) the system will ignore all availability status information. |
| ECS | BOOL | Enable Cleanliness Status | This is a configuration item used to determine whether the Unit Cleanliness Status is actively being used by the system. When set to zero (0) the system will ignore all cleanliness status information. |

TABLE 3-continued

| Name | Type | Description | Details |
|------|------|-------------|---------|
| EPS | BOOL | Enable Process Status | This is a configuration item used to determine whether the Unit Process Status is actively being used by the system. When set to zero (0) the system will ignore all process status information. |
| EQS | BOOL | Enable Quality Status | This is a configuration item used to determine whether the Unit Quality Status is actively being used by the system. When set to zero (0) the system will ignore all quality status information. |
| ESP | DINT | E-Stop Pointer | This is a pointer to the IO Buffer location for E-Stop zone data. |
| SSP | DINT | Software Stop Pointer | This is a pointer to the IO Buffer location for S-Stop zone data. |
| EF1T | STRING_40 | UNIT Fault 1, Description | Used to describe a definable UNIT Module Fault. |
| EF2T | STRING_40 | UNIT Fault 2, Description | Used to describe a definable UNIT Module Fault. |
| EF3T | STRING_40 | UNIT Fault 3, Description | Used to describe a definable UNIT Module Fault. |
| EF4T | STRING_40 | UNIT Fault 4, Description | Used to describe a definable UNIT Module Fault. |
| MCT | DINT | Maximum UNIT Cycle Time | A preset in minutes that defines the maximum time that any one batch may take within the UNIT Module. If this maximum is exceeded then a fault will be generated. A value of zero disables this functionality. |
| CPN | BOOL | Enable Campaigning | The Enable Campaigning configuration bit allows the user to enter a value into the Campaign Count preset register. While the actual Campaign Count is less than the Campaign Count preset the UNIT will continue to run the same product. |
| EMP | BOOL | Enable Mode Propagation | By enabling mode propagation at the UNIT level, all associated device will look to the level above to determine if they may go in or out of Auto mode. |
| EFP | BOOL | Enable Fault Propagation | By enabling fault propagation at the UNIT level, all associated device will transfer there fault status to the level above. This would enable a Control Module failure to place a UNIT in the faulted state. |
| EPP | BOOL | Enable Permissive Propagation | By enabling permissive propagation at the UNIT level, all associated devices will include the status of the UNIT permissives along with there own permissives. |
| ERP | BOOL | Enable Reset Propagation | By enabling reset propagation at the UNIT level, when a reset command is issued to the UNIT it will be acted on and transferred to all associated devices. |
| D1MN | DINT | Data Entry Field 1. Minimum Value | The minimum value for the HMI face plate $1^{st}$ data entry field |
| D1MX | DINT | Data Entry Field 1. Maximum Value | The maximum value for the HMI face plate $1^{st}$ data entry field |
| D2MN | DINT | Data Entry Field 2. Minimum Value | The minimum value for the HMI face plate $2^{nd}$ data entry field |
| D2MX | DINT | Data Entry Field 2. Maximum Value | The maximum value for the HMI face plate $2^{nd}$ data entry field |
| D3MN | DINT | Data Entry Field 3. Minimum Value | The minimum value for the HMI face plate $3^{rd}$ data entry field |
| D3MX | DINT | Data Entry Field 3. Maximum Value | The maximum value for the HMI face plate $3^{rd}$ data entry field |
| EU1 | STRING [4] | HMI Faceplate Engineering Units Storage 1 | The HMI Face Plates require a storage location for engineering units. EU1 holds a xxx string for this Unit |
| EU2 | STRING [4] | HMI Faceplate Engineering Units Storage 2 | The HMI Face Plates require a storage location for engineering units. EU2 holds the xxx engineering units for this Unit |
| EU3 | STRING [4] | HMI Faceplate Engineering Units Storage 3 | The HMI Face Plates require a storage location for engineering units. EU3 holds the xxx engineering units for this Unit |

In order to avoid unauthorized changes to the configuration that would defeat validation or create other problems, degrees of security codes are incorporated into the various layers of the hierarchy. In particular, a high degree of clearance is required to save a configuration.

Figure 9:
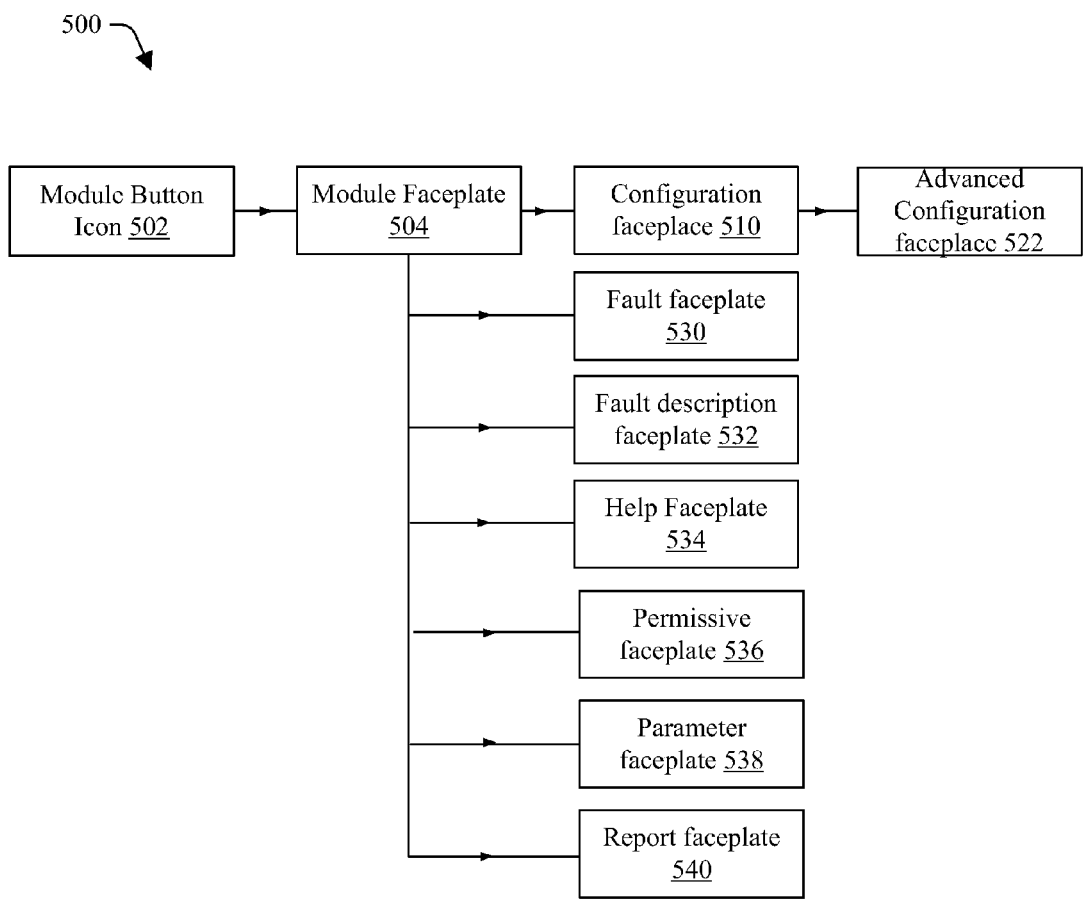
FIG. 9 is a diagram of a human-machine interface (HMI) navigation between module faceplates.
Figure 10:
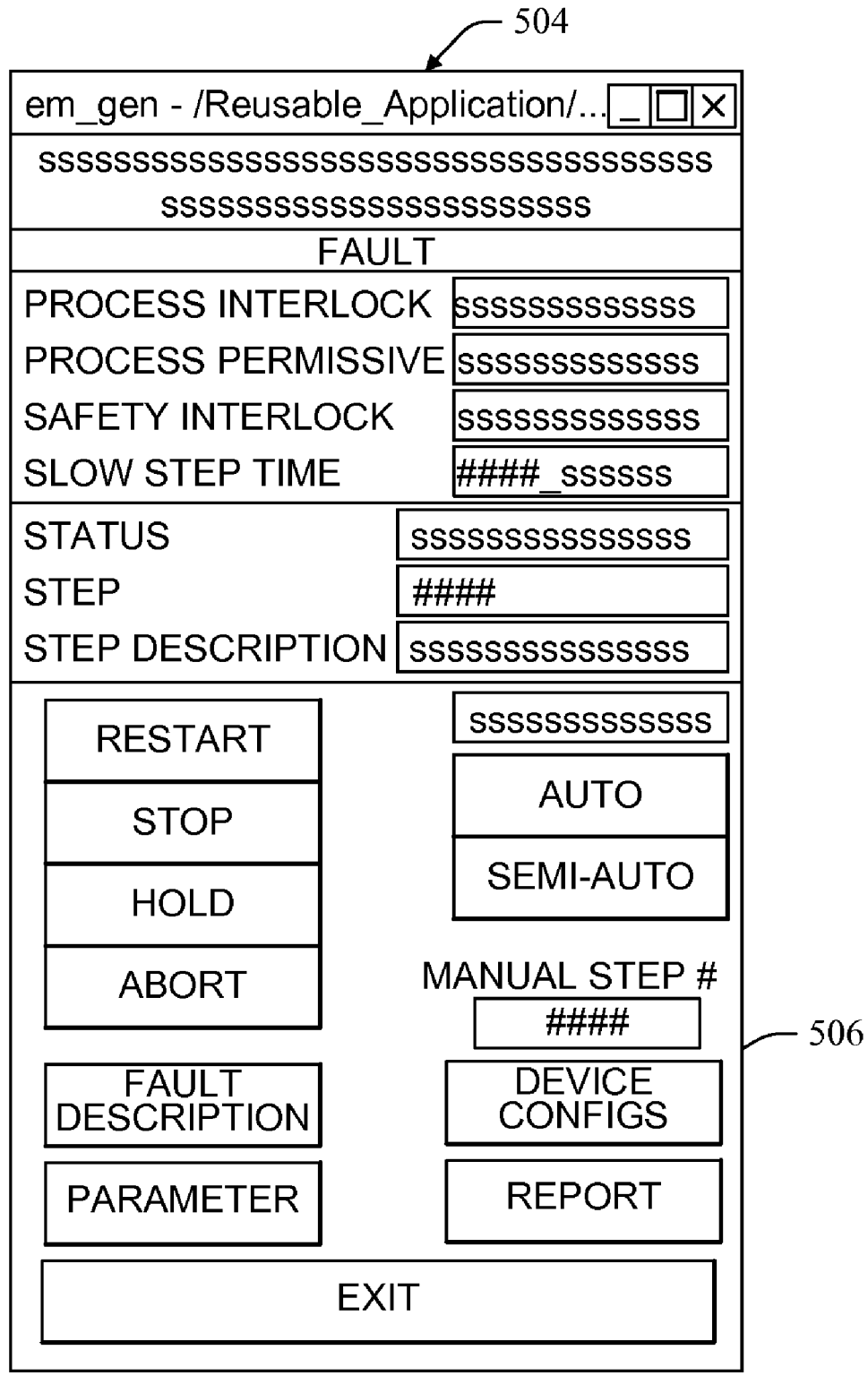
FIG. 10 is a graphical depiction of a general module faceplate of the HMI navigation of FIG. 9.
Figure 11:
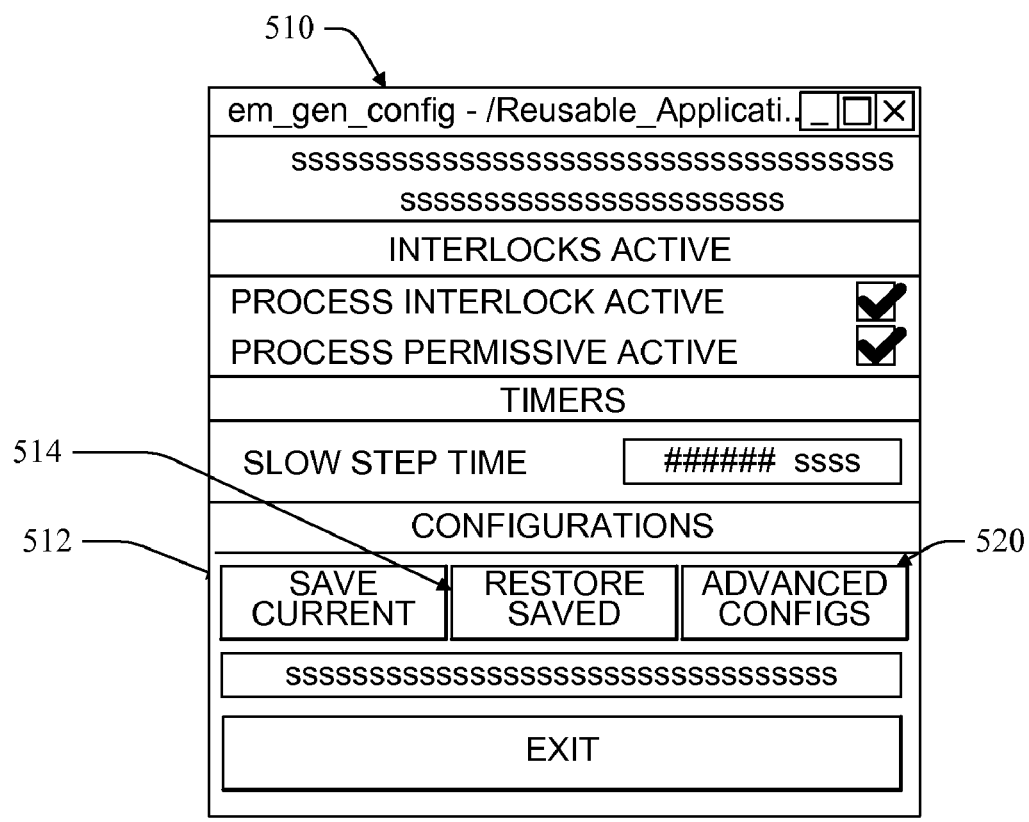
FIG. 11 is a graphical depiction of a configuration faceplate of the HMI navigation of FIG. 9.
Figure 12:
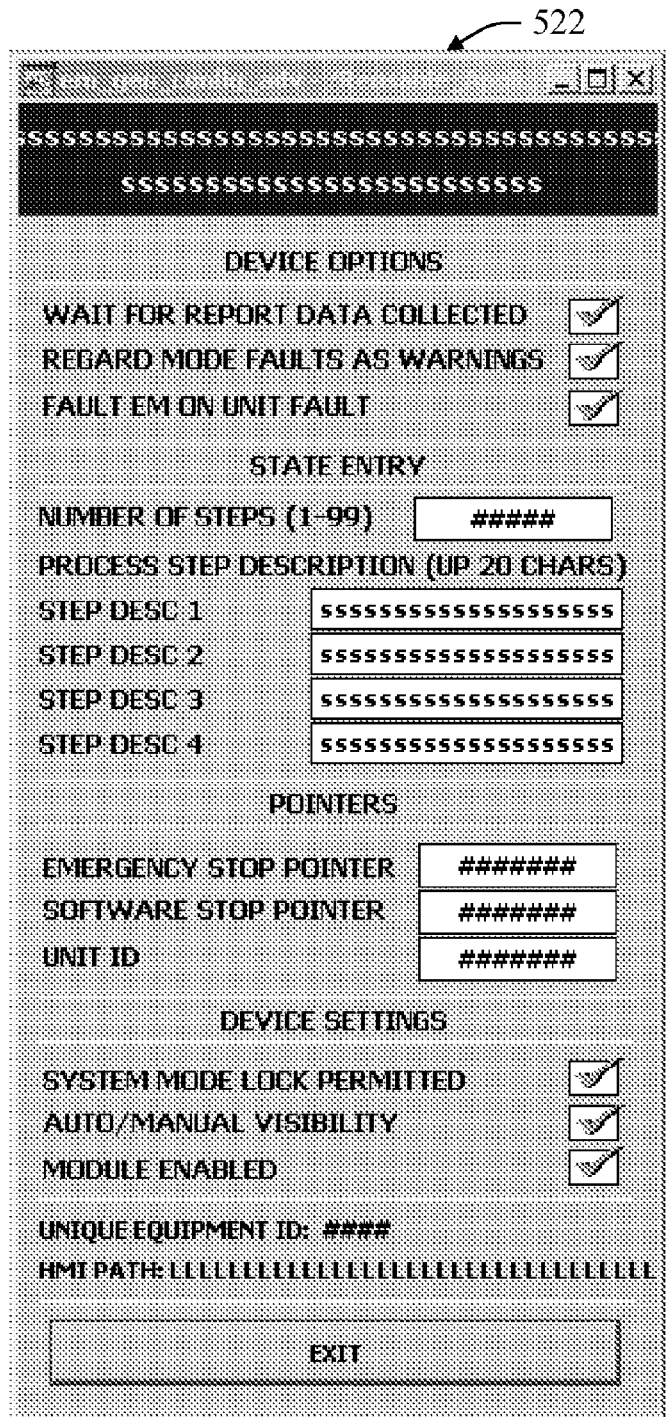
FIG. 12 is a graphical depiction of an advanced configuration faceplate of the HMI navigation of FIG. 9.

Referring now to FIG. 9, an human-machine interface (HMI) 500 depicts a navigation between faceplates for accessing configuration parameters, such as the afore-described configuration data structures. Selection of a Module button 502 on a graphical user interface (GUI) brings up an Equipment Module Basic Control Faceplate 504, which is typically used by the operator for daily viewing and control of the system (FIG. 10). In FIG. 10, interacting with this faceplate 504, such as selecting device configuration button 506, allows navigating to the Configuration Faceplate 510 (FIG. 11), In FIG. 11, the configuration faceplate 510 is typically used by maintenance for periodic overrides and troubleshooting of the system and includes a save current configuration button 512 and a restore saved configuration button 514 for creating or restoring a validated configuration. An advanced configs button 520 navigates to an advanced configuration faceplate 522 (FIG. 12). In FIG. 12, the advanced configuration faceplate 522 is typically used by engineering during startup to configure the device in the system. It may also be used if the physical operating parameters of the Equipment Module.

Returning to FIG. 9, from the module faceplate 502, other faceplates are reachable: A Fault Description Faceplate 530 is a PDF description of all detailed faults for this module. It is typically used by any user of the system when a detailed alarm occurs. This screen offers the most likely cause of the fault along with a few recommended solutions. A Fault Listing Faceplate 532 displays all active alarms for the module. A Help Faceplate 534 offers help on topics such as CLX location of Interlock. A Permissive Faceplate 536 offers display of permissive for the module. A Parameter Faceplate 538 offers parameter display and setting. A Report Faceplate 540 offers report display and setting.

Figure 13:
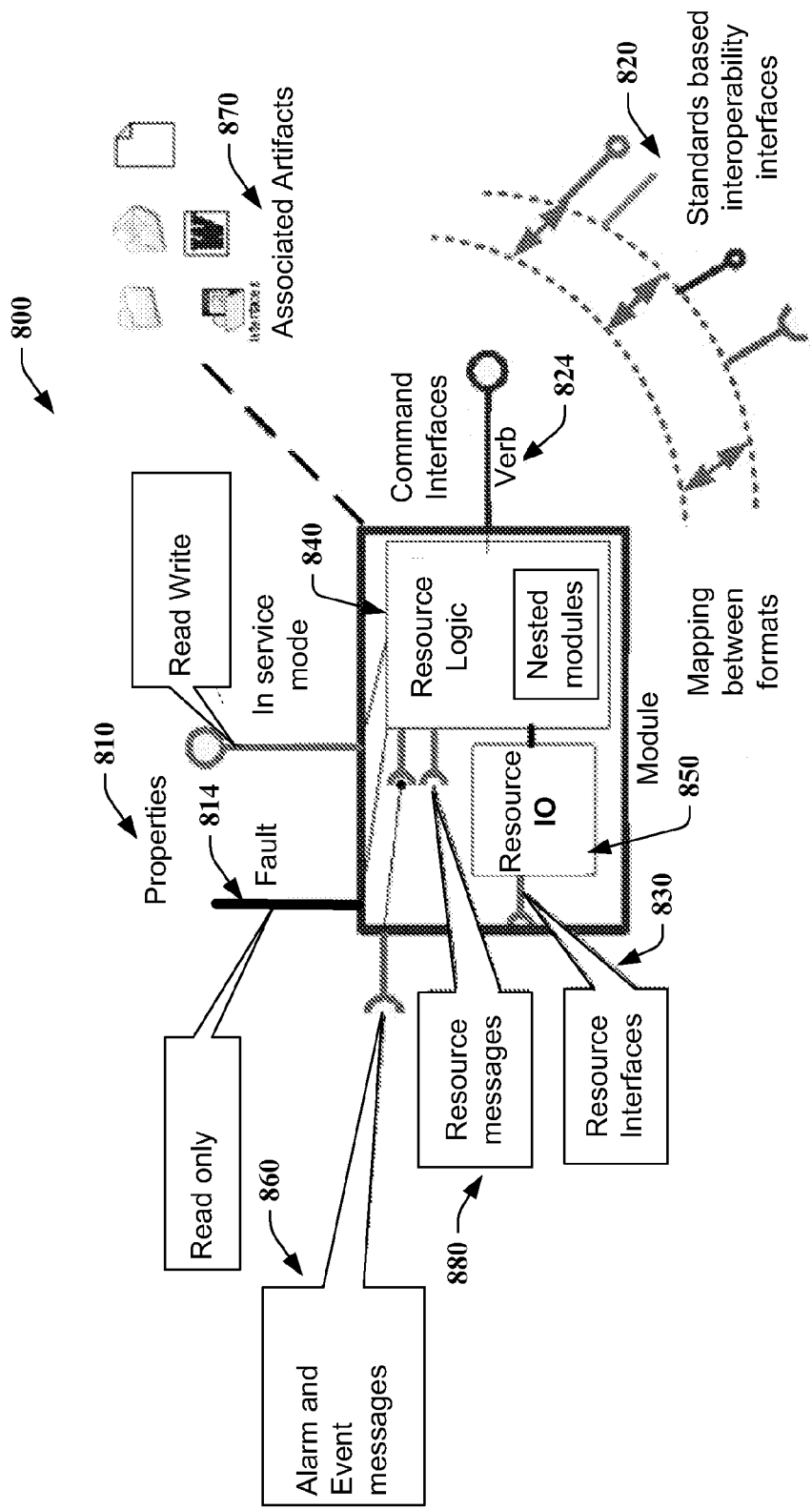
FIG. 13 is a diagram illustrating module attributes.

Referring now to FIG. 13, module attributes 800 are illustrated. The attributes 800 depicted in FIG. 13 include a common (or exemplary) representation that can be modules from modules. Generally, a set of standard attributes can be determined that are common to all modules. Similarly, for other types of modules described below, additional standard attributes can be defined. An example of a property 810 available on modules includes attributes such as Fault and Status at 814. Active resource modules (e.g., equipment and personnel) can support additional properties 810 such as available/unavailable.

Attributes presented below are represented associations from the module to objects which may be internal in a common data model or elsewhere (e.g., CAD Files). At 820, standard public interfaces can be provided. These interfaces 820 publish verbs 824 that are available to external systems and are documented activities that hide the complexity of the underlying code used to implement the interface. Interfaces 820 can be considered into at least two common usage scenarios. For example, interfaces 820 can be used as access points that can be used to hook in real time diagnostics, security and so forth.

Public verbs 824 initiate an action within the module. The activity is described to clients of the interface 820. The implementation is considered private and is not presented to clients—for example, Open, Stop, Abort, Shut, and so forth. A data value property 810 provides public access to information that is used by the module during its operation and can be provided by request values and/or internal values (or an equivalent). The association of logic to transfer request values to internal values and vice versa are referred to as get and set logic for the value. It is noted that in a controller, if there is not a set routine to transfer request values to internal values, the internal value can overwrite the request value on the next scan providing read only capability.

In general, the properties 810 can be considered in at least two classifications. States have special significance for production systems and can have a specific set of values that can be represented by range or enumeration. A state can represent the current status of the primary resource being encapsulated by the module e.g., Percent open, Mode, Service (in, out), and so forth. Information that is used by the module during its operation includes access to data that is provided by interfaces 820. e.g., Conversion Map, Name, Description, expiry date, personnel contact information. Some properties 810 can be common to all instances of resource modules (e.g., scanned copy of resource specification documents), whereas other properties 810 are specific to each module instance (e.g., Status, percent open).

At 830, internal resource interfaces include interfaces from logic 840 in the module to the resource being managed at 850, where the logic includes code and/or configuration that processes a command and/or updates state and data properties. In some cases, this can be hardware such as I/O interfaces, or in other cases it is to subordinate resource control modules that have direct interfaces. Some examples include I/O mapping, material management logic routines, and so forth. These interfaces 830 are internal to the module enabling the module's public interfaces 820 and properties 810 to be the boundary to other system components. Modules that wrap different resources but support the same public properties/interfaces can be exchanged without disrupting interfaces to other components. Generally, I/O mapping and system messaging interfaces are exposed during deployment bind processes. When bound, external interfaces 820 to runtime systems may then consider these interfaces as internal.

At 860, alarm and event messages can be provided which include messages that exposed as runtime messages visible to external systems during the execution of the module. This includes alarms and events explicitly coded by the developer and system messages promoted to be visible by external systems. At 870, one or more artifacts include information that document the operation and structure of the resource such as for example, wiring diagrams, warranties, payroll, parts supplier information, and so forth. Visualization aspects include associated graphics that present the resource state and properties to applications interacting with the resource. For example: faceplates, icons, state overlays, edit dialogs, help files. At 880, system messages allow modules to listen for and publish data model messages to external components. Inbound messages are typically used to manage modules (configure, initialize, propagate properties, and so forth) and publish messages on module activity (resource state, data model messages, and so forth).

Figure 14:
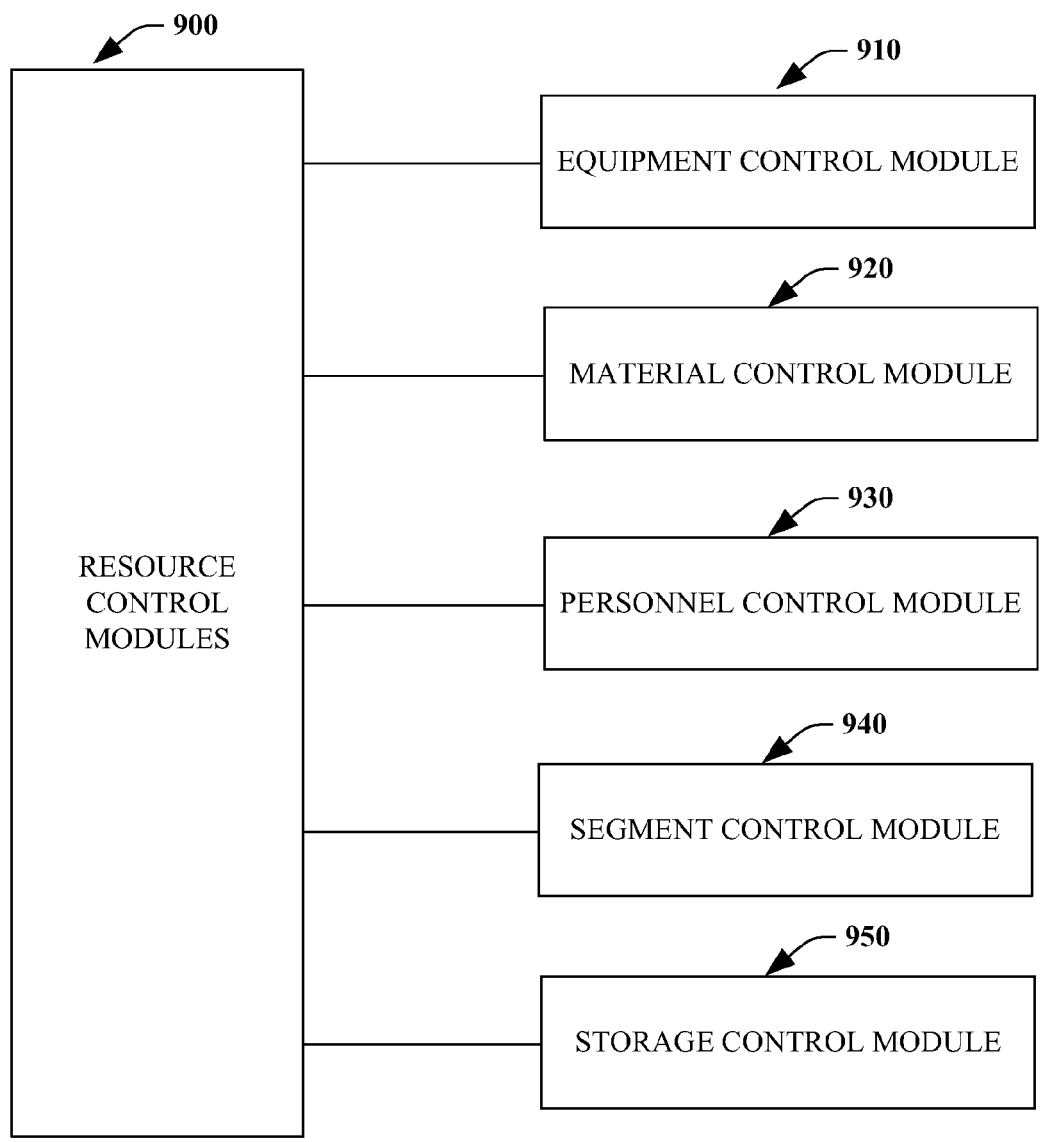
FIG. 14 is a diagram illustrating example resource control modules.

Turning to FIG. 14, example resource control modules 900 are illustrated. In general, resource control modules 900 provide simple control of one or more resources. The resource control module (RCM) 900 represents the logic to manage the state or data of the resource and may contain other resource control modules to achieve its respective functionality. The RCM 900 provides public interfaces via actions and properties. In some cases, an action may be a simple bit value or a request value that is interfaced to internal values in the module and in other cases more complex logic can be provided. The RCM 900 can include other resource control modules and may promote a command to be represented as segment resource control interface. Example forms of the RCM 900 include:

At 910, an Equipment Control Module (Common name="Control Module") CM. The simplest form of basic regulatory control of equipment. Encapsulating the equipment and its control such as control of values, drives, and so forth. At 920, a Material Control Module (MCM) can be provided. Management of Material resource instances which are represented as sub-lots including change in location, quality status, availability, order status, logic that can be performed on material sub-lots, generation of material events such as consumed, produced and moved events, sub-lot combination, expiry dates, and so forth.

At 930, a Personnel Control Module (PCM) is provided. This includes management of individual people such as Active, Idle, Break states directly or via shift schedules. This also includes data associated with people such as shift time patterns, for example. Other attributes that may be managed by PCM 930 are a person's location in a plant (GPS), qualification checks, or current assignment, for example. At 940, a Segment Control Module (SCM) includes manipulation of simple segment tasks such as piping paths, AGV paths, device state machines, robotic sequences and so forth. The SCM 940 typically performs an action on one segment such as next step to execute after the current step. At 950, a Storage Control Module (STGCM) includes Manipulation of simple storage logic such as buffer capacity and ordering into and out of a queue for the respective storage unit or requirement.

Figure 15:
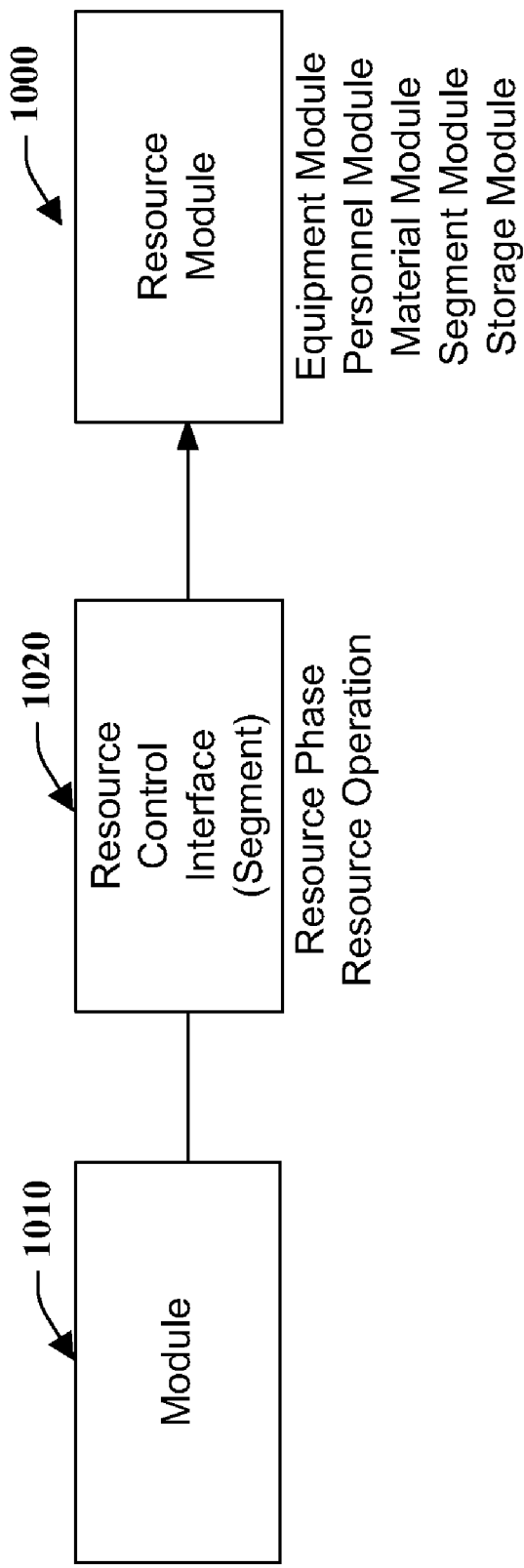
FIG. 15 is a diagram illustrating a resource module.

FIG. 15 illustrates a resource module 1000 for an industrial control system. Resource modules 1000 extend resource control modules described above to enable coordination of resources (equipment, people, modules and so forth) to achieve. As shown, the resource control module 1000 includes a module 1010 and a resource control interface 1020. Resource modules 1000 are also able to represent more complex activities than resource control modules. For example, resource modules may include other resource control modules at 1010 and/or other resource modules. For example, an equipment module may leverage a subordinate material control module to represent material handling aspects or a segment module to solicit an electronic signature.

Before proceeding it is noted that other types of modules are possible than shown. For instance, a configuration module may include management definitions and configuration of resources—personnel, segments, equipment, segments, storage, and so forth. Another type of module includes nested modules where a module references other modules. These modules may be children of a parent module or shared from one module to another. Resource modules may include resource control modules however resource control modules should not include resource modules. Modules can include modules focused on other resource types, for example an equipment module may include equipment modules and material modules.

Figure 16:
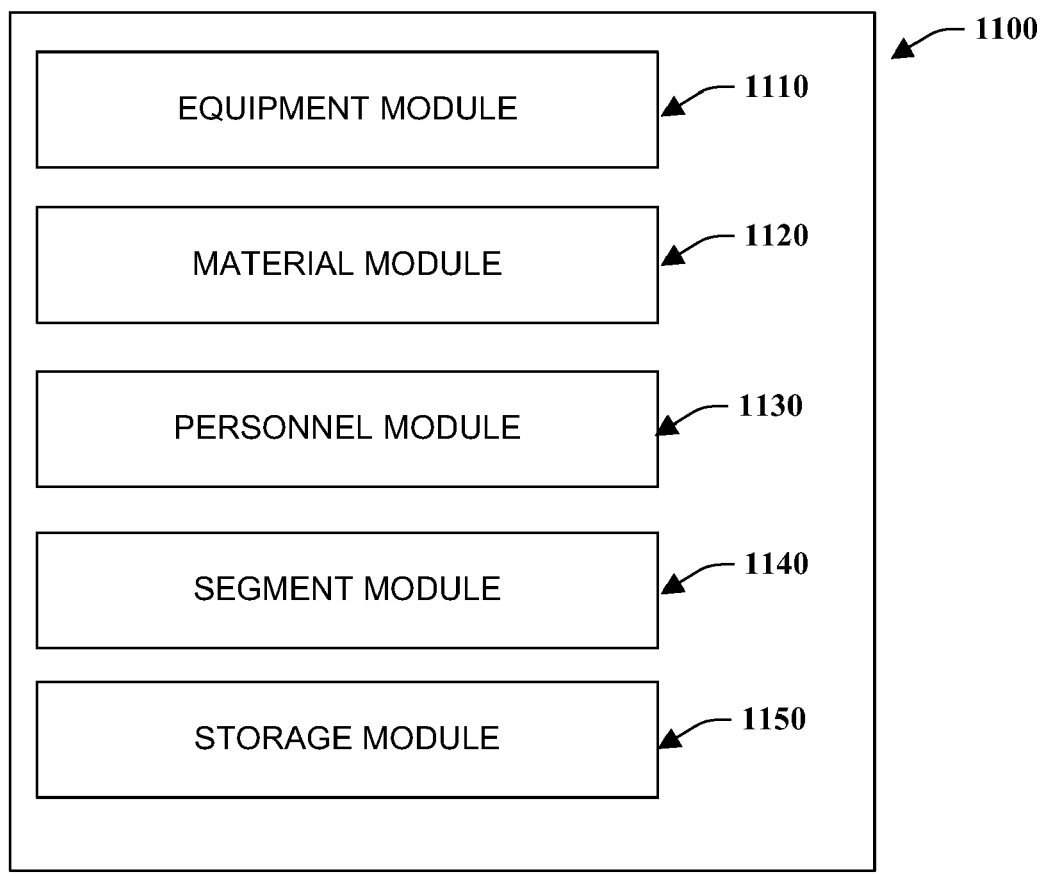
FIG. 16 is a diagram illustrating example resource modules.

FIG. 16 illustrates example resource modules 1100 for an industrial control system. At 1110, an Equipment Module provides coordination of equipment modules and equipment control modules to perform a process-orientated task independent of specific material e.g., In-feed, AGV controller, Conveyor, and so forth. At 1120, a Material Module provides coordination of material modules and material control modules to perform material focused tasks e.g., Material reservation, provision, material mass balance calculation, Bill of Material management, Work order management, and so forth. At 1130, a Personnel Module provides coordination of personnel modules and personnel control modules to perform personnel focused tasks e.g., Electronic signature collection, Security validation, certification validation, Manual control interactions, and so forth.

At 1140, a Segment Module provides coordination of segment modules and segment control modules and to execute sequences of tasks represented by segments. Segments define resource requirements and ordering that can represent most production and process activities. This module provides access to more complex tasks that require specific sequences to be followed e.g., Process Analytics Technology (PAT) integration, electronic signatures collection, defect, process deviation and fault recovery processing. The segment module 1140 may also construct a sequence to be followed that can be applied as manual, automatic or semi automatic sequences (e.g., Route, recipe execution) At 1150, a Storage Module provides coordination of storage related activities, allocation of storage to requesters, modeling of inventory calculations and so forth. This also includes interaction with higher-level systems that manage storage and inventory information.

Figure 17:
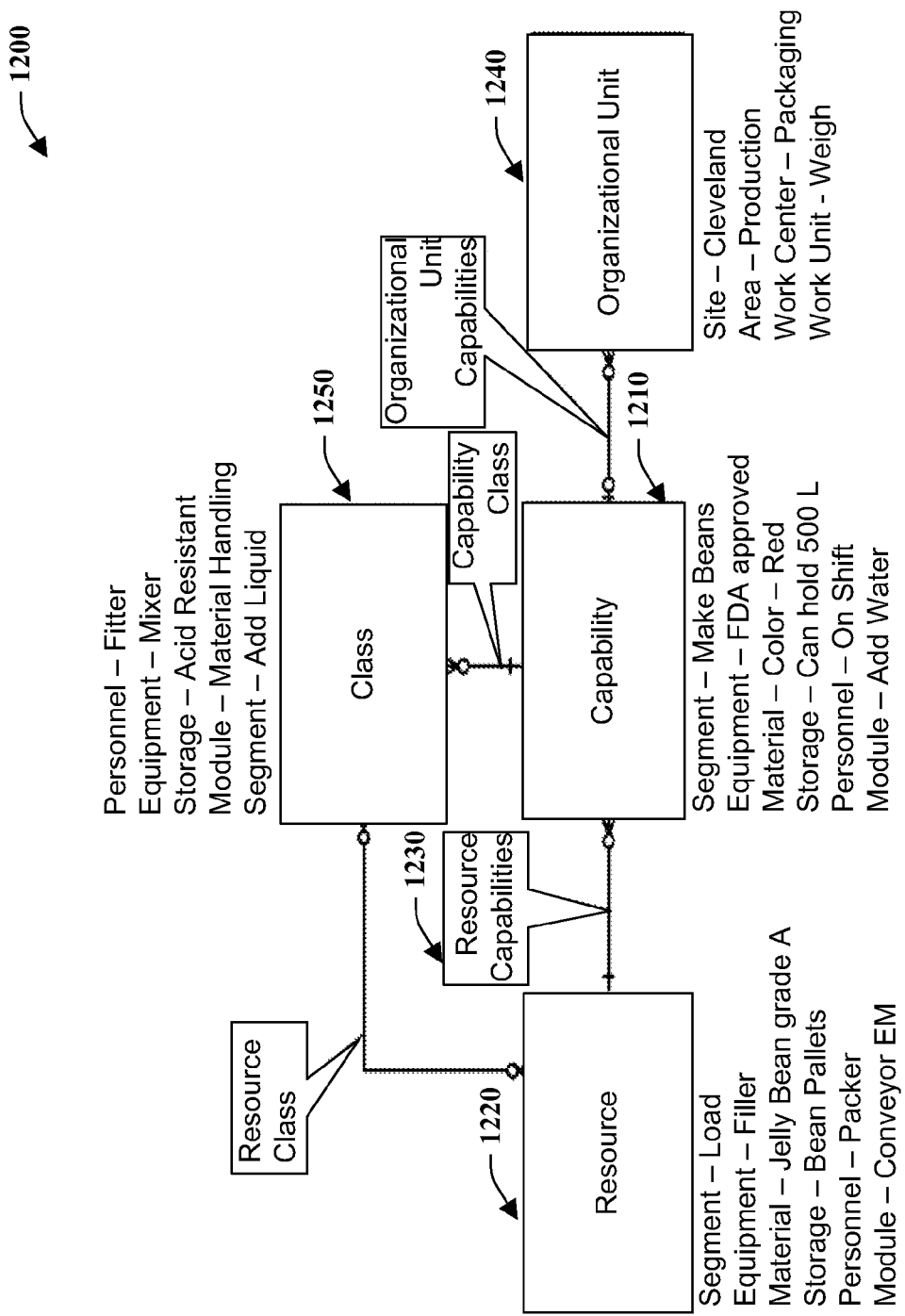
FIG. 17 is a diagram illustrating a resource control model.

FIG. 17 illustrates an example resource control model 1200 for an industrial control system. Resource Control Interfaces are the interfaces exposed to production management systems for resource binding and arbitration purposes. The interfaces are elements of the resource control model 1200 including procedures, operations or phases. These interfaces are made available by exposure via one or more capabilities 1210 described below. Procedures, operations and phases depicted in this model 1200 are commonly referred to in association with their module resource type such as Equipment Phase, Personnel Phase, Segment Phase, or as a generic Resource Phase where no specific resource module is required. Production management including Product Production Rules (production route or control recipe) physically bind to (reference) resource control phases to perform work. The availability of other resources 1220 such as material, equipment, personnel are considered during the binding process of product production rules to work centers (production lines, process cells, and so forth). These selection processes evaluate resource capabilities to locate the appropriate resource for the task.

Resource capabilities 1210 include the resource 1220 required to perform work in a production system. Consequently, resources 1220 are at the centre of efficiency, capacity, scheduling and arbitration considerations. A resource's ability to work or be available to allow work to commence is represented as resource capability at 1230. The existence of capability 1230 associated with a resource 1220 does not make the resource available for production; the resource's capability 1230 is associated with organizational units 1240 that are will support the respective resource capability. For example, an operator (personnel resource) may have qualifications for a Mixer in line 1, where this qualification capability is only in effect with that specific mixer unless explicitly directed. Resource arbitration algorithms can search for resource capabilities 1230 in the scope of organizational units 1240 they are to be executed within.

Resources 1220 publish capabilities to organizational units 1240 for use by system processes in a given scope. Modules are a type of resource and can be accessed directly by published capabilities 1210. However, a more common interface to Resource Modules is via verbs that are supported by the Resource Module noted above. These verbs are Resource Control elements (phases, operations, procedures . . . ) which are segments. A published capability of a resource module is typically one of the phases supported the module. Resource control interfaces are published (made available) to the outside world as capabilities 1210. Resource modules provide the ability to promote a command to become a resource control interface.

Some process control systems are built using only Resource control modules (especially control modules). Examples of this are continuous processes such as petrochemical and heavy chemical plants. In order to initiate, the process takes a plant up to its running state or makes a change to the state of a series of commands that are initiated and coordinated to achieve the new state. It is also possible to promote commands from resource control modules to appear as capabilities that can be accessed as "tuning knobs" for tweaking the system between system states. As shown in the model 1200, the resource 1220 and capability can be associated with a higher-level class or abstraction 1250.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that determines configuration changes in a validated system, comprising:
an industrial control module that controls an industrial process, the industrial process comprising at least a validated portion, further comprising:
a processor,
a computer readable storage medium operationally coupled to the processor and storing computer executable instructions, the computer executable instructions, if executed by the processor, implement components comprising:
a control component comprising generic operations to control the industrial process utilizing the processor, the control component further comprising a current configuration data structure representing a current configuration of the industrial process and a validated saved configuration data structure defining a validated configuration of the industrial process;
an interface component that modifies the current configuration of the industrial process; and
a reporting component that compares the current configuration data structure against the validated saved configuration data structure and provides a notification of a detected difference indicative of an unvalidated component within the validated portion of the industrial process; and
wherein the computer readable storage medium retains the current configuration data structure and the validated saved configuration data structure.

2. The system of claim 1, further comprising a human-machine interface responsive to the reporting component that communicates the notification.

3. The system of claim 2, wherein the current configuration data structure and the validated saved configuration data structure contain a plurality of record entries, the human-machine interface displaying individual entries of the current configuration data structure that do not conform to the validated saved configuration data structure.

4. The system of claim 2, wherein the human-machine interface is responsive to a security code to enable saving the current configuration data structure to the validated saved configuration data structure.

5. The system of claim 2, wherein the human-machine interface facilitates selective modification of the current configuration data structure to the validated saved configuration data structure to restore the industrial process to the validated configuration.

6. The system of claim 1, wherein the industrial process comprises at least one configurable component not included in the validated portion, the reporting component ignores changes to a configuration of the at least one configurable component.

7. The system of claim 1, wherein the interface component is associated with at least one of a unit interface, an equipment phase interface, or an equipment interface.

8. The system of claim 1, the control component further comprising at least one behavior component that defines one or more functional aspects of the control component.

9. The system of claim 1, the control component further comprising at least one coordination and control component to interact with at least one industrial control module.

10. The system of claim 1, further comprising at least one unit to communicate with the control component, the current configuration data structure and the validated saved configuration data structure associated with the at least one unit.

11. A computer-implemented method for determining configuration changes in a validated system, comprising:
controlling an industrial process comprising at least a validated portion comprising a set of components having a validated configuration;
employing a processor executing computer-executable instructions stored on a computer-readable storage medium to implement the following acts:
storing on a controller the validated configuration for the set of components;
monitoring the industrial process by the controller;
determining, at the controller, if a change has been made to a current configuration of the set of components in comparison with the validated configuration; and
generating an automatic notification if a change is detected between the current configuration and the validated configuration indicative of an unvalidated component within the validated portion.

12. The method of claim 11, further comprising reporting the automatic notification in human-intelligible form.

13. The method of claim 11, wherein the determining if a change has been made to the current configuration further comprises comparing the saved validated configuration with a current configuration.

14. The method of claim 13, further comprising saving the current configuration as the validated configuration subject to an authorizing security code.

15. The method of claim 13, further comprising restoring the validation configuration as the current configuration to restore the set of configured components to their validated configuration.

16. The method of claim 11, further comprising ignoring configuration changes to controllable components not utilized during the creation of the validated configuration.

17. A system for determining configuration changes in a validated system comprising at least a validated portion, comprising:
an industrial controller, further comprising;
a processor;
a computer-readable storage medium storing computer-executable instructions, the computer-executable instructions, if executed by the processor, implement the following:
means for monitoring, by the processor, one or more module components within the validated system;
means for determining, by the processor, if a change has been made to a configuration applied to the module components;
means for determining whether the change affects the validated portion of the validated system; and
means for generating an automatic notification if the means for determining determines that the change affects the validated portion of the validated system.

18. The system of claim 17, further comprising means for restoring the current configuration to a validated configuration.

19. A computer-readable storage medium having a data structure stored thereon, comprising:
- a module component comprising generic operations to control an industrial process, the module component further comprising a current configuration data structure representing a current configuration of the industrial process and a stored validated configuration data structure defining a validated configuration of the industrial process;
- an interface that modifies the current configuration data structure; and
- a reporting component provides a notification of a detected difference between the current configuration data structure and the stored validated configuration data structure.

20. The computer-readable storage medium of claim 19, further comprising an human-machine interface (HMI) that provides a first selectable option to restore the stored validated data structure to the current configuration data structure and a second selectable option to save the current configuration data structure as the stored validated configuration data structure.

* * * * *

UNITED STATES PATENT AND TRADEMARK OFFICE
CERTIFICATE OF CORRECTION

| | |
|---|---|
| PATENT NO. | : 7,725,200 B2 |
| APPLICATION NO. | : 11/856563 |
| DATED | : May 25, 2010 |
| INVENTOR(S) | : Dale Edward Reed, Mark K. Carmount and N. Andrew Weatherhead |

Page 1 of 1

It is certified that error appears in the above-identified patent and that said Letters Patent is hereby corrected as shown below:

On the title page item (75), delete "Mark K. Carmou" and replace with "Mark K. Carmount"

Signed and Sealed this

Tenth Day of August, 2010

David J. Kappos
*Director of the United States Patent and Trademark Office*